(12) United States Patent
Minami et al.

(10) Patent No.: US 10,375,374 B2
(45) Date of Patent: Aug. 6, 2019

(54) DIMENSION EXTRACTABLE OBJECT COMPRISING SPATIAL METADATA FOR A CAPTURED IMAGE OR VIDEO

(71) Applicant: Plethron Inc., a Delaware corporation, Palo Alto, CA (US)

(72) Inventors: Eric Minami, Palo Alto, CA (US); Charles Chu, Cupertino, CA (US)

(73) Assignee: Plethron Inc., Palo Alto, CA (US)

( * ) Notice: Subject to any disclaimer, the term of this patent is extended or adjusted under 35 U.S.C. 154(b) by 9 days.

(21) Appl. No.: 15/473,098

(22) Filed: Mar. 29, 2017

(65) Prior Publication Data

US 2018/0288355 A1    Oct. 4, 2018

(51) Int. Cl.
| | |
|---|---|
| H04N 13/178 | (2018.01) |
| G06T 3/40 | (2006.01) |
| G06T 17/00 | (2006.01) |
| H04N 1/00 | (2006.01) |
| G06Q 10/08 | (2012.01) |
| G06Q 30/06 | (2012.01) |

(52) U.S. Cl.
CPC ......... *H04N 13/178* (2018.05); *G06T 3/4038* (2013.01); *G06T 17/00* (2013.01); *H04N 1/00* (2013.01); *G06Q 10/083* (2013.01); *G06Q 30/0601* (2013.01)

(58) Field of Classification Search
USPC .......................................................... 348/36
See application file for complete search history.

(56) References Cited

U.S. PATENT DOCUMENTS

| | | | |
|---|---|---|---|
| 9,369,727 B2 | 6/2016 | Alagha et al. | |
| 2005/0086582 A1* | 4/2005 | Frojdh | H04L 29/06027 715/202 |
| 2013/0142431 A1* | 6/2013 | Jin | G06K 9/3275 382/190 |
| 2015/0325038 A1* | 11/2015 | Baker | G06T 15/205 345/426 |
| 2017/0046594 A1* | 2/2017 | Nerurkar | G05D 1/0268 |
| 2018/0276841 A1* | 9/2018 | Krishnaswamy | H04N 7/185 |

OTHER PUBLICATIONS

Melissa Linked; access to image data in the real world, 2010, JSTOR Journals, 777-783.*

* cited by examiner

*Primary Examiner* — Behrooz M Senfi
(74) *Attorney, Agent, or Firm* — DLA Piper LLP (US)

(57) ABSTRACT

The invention relates to capturing a still or moving image as well as object position and displacement data for the image, storing the image and the data as a dimension extractable object, and utilizing the dimension extractable object.

13 Claims, 26 Drawing Sheets

FIGURE 7

Structure of Compressed File
700

| | |
|---|---|
| SOI | Start of Image |
| APPn | Application Marker Segments<br>APP1 – EXIF metadata<br>(APP2) (APP3) ... (APPk)<br>APPk – Dimension metadata |
| DQT | Quantization Table |
| DHT | Huffman Table |
| (DRI) | (Restart Interval) |
| SOF | Frame Header |
| SOS | Scan Header |
| | Compressed Data |
| EOI | End of Image |

710

710

| |
|---|
| APPk marker |
| APPk length |
| Dimension Extractable Object Metadata Identifier Code |
| Metadata 1 (Descriptor, Value) |
| Metadata 2 (Descriptor, Value) |
| ... |
| Metadata N (Descriptor, Value) |

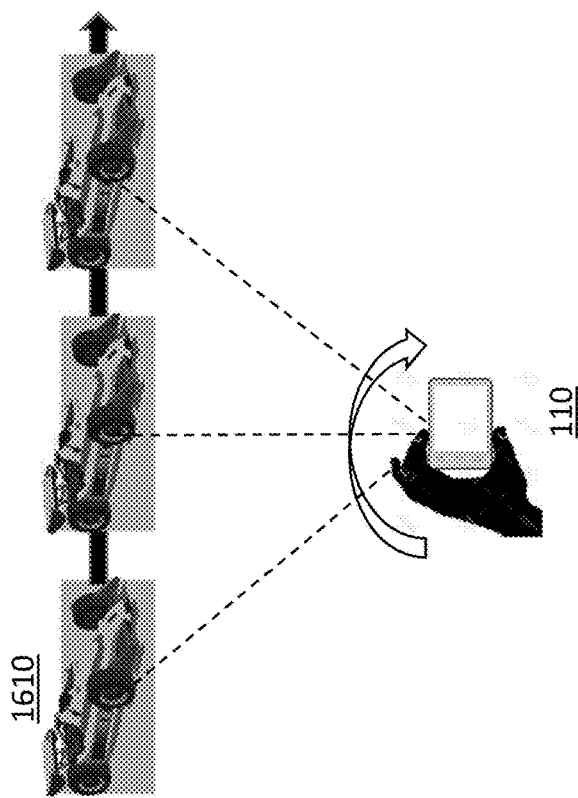
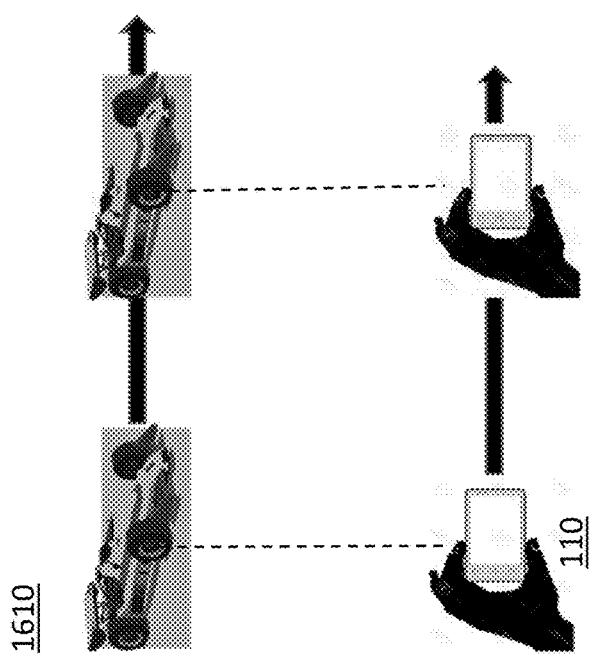
FIGURE 17

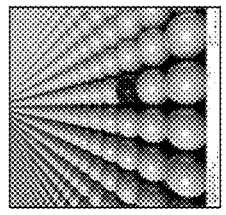
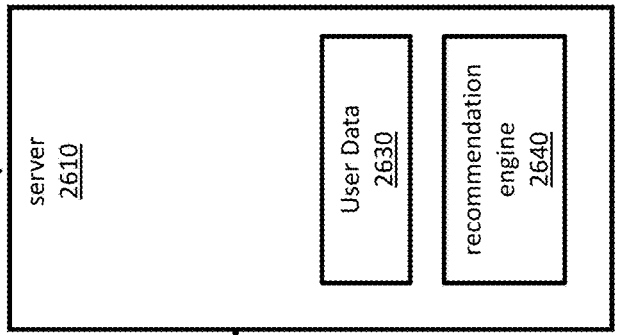
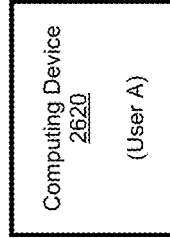
FIGURE 26

DIMENSION EXTRACTABLE OBJECT COMPRISING SPATIAL METADATA FOR A CAPTURED IMAGE OR VIDEO

TECHNICAL FIELD

This invention relates to capturing a still or moving image as well as spatial metadata for the image, storing the image and the spatial metadata as a dimension extractable object, and utilizing the dimension extractable object.

BACKGROUND OF THE INVENTION

Cameras are well-known in the prior art. FIG. 1 depicts a simplified diagram of prior art camera 110 comprising photodiode 111. Photodiode 111 receives light through an aperture in camera 110 and converts light into electric current or voltage. As is well-known, a still image or moving image (video) can be captured of an object of interest, such as physical object 120 in this example.

Also in the prior art, certain digital image capture formats allow for the insertion of metadata, that is, data that is related to the image but not necessary for reconstruction of the image. Example of such image formats are the JPEG format for still images and the MPEG-4 (H.261) format for moving images (video). These formats allow for the embedding of arbitrary metadata that describes information related to the capture of the image. Examples of metadata that is frequently embedded in digital images include date of capture, GPS coordinates of capture location, camera settings (shutter speed, aperture), copyright data, image size, and software used to process the image.

There are numerous metadata standards that define the data model for the metadata. One example is Extensible Metadata Platform (XMP). XMP is a standard format that does not restrict the attribute field of the metadata and has a flexible definition of the type of data value. Other standard formats, such as Dublin Core (DCI), Information Interchange Model (IIM), and Exchangeable Image File Format (EXIF), have specific elements (attributes) and value types. For example, XMP standard defines special namespaces for DCI elements. In general, image formats do not require any metadata. Furthermore, image formats do not require existing metadata to follow a standard.

Some encoding formats for digital still image are JPEG, GIF, PNG, JPEG2000, BMP, FITS, TIFF, RAW, and FITS. All these formats allow insertion of metadata into the file. Common video encoding formats typically are all container formats because the formats need to support multiple types of data streams—e.g. video, audio, and subtitles. The formats typically support metadata for the container itself; a few support a metadata stream that can be synchronized with the video image. Examples of video container formats include MP4, AVI, MPEG, MKV, Ogg, MXF, DPX, and Quicktime, of which only MKV (Matroska) and Ogg are open source. The most common video stream encoding format is MPEG-2 (H.261), which is streamed video supported in most container formats.

The prior art also includes numerous three-dimensional (3D) modeling formats, some proprietary and tied to a specific software tool such as the products sold with trademarks AutoCad and Lightwave, while others are more general. Simple 3D modeling formats like STL and OBJ do not have definitions for metadata, but most proprietary and newer formats supports embedded metadata. Examples of 3D modeling formats include AMF, STL, OBJ, Blender, DWG (used by the product with trademark Autocad), X3D, SKP (used by the product with trademark Google Sketchup), and LWO (used by the product with trademark Lightwave).

Also known in the prior art are laser distance measuring devices for measuring the distance between the device and an object. FIG. 2 depicts prior art distance measuring device 210, which comprises laser diode 211, photodiode 212, lens 213, and lens 214. In one prior art technique, laser diode 211 emits modulated laser light. The light is focused through lens 213, hits physical object 120, and the light reflects off of physical object 120. A portion of the light will return to distance measuring device 210 through lens 214 and hit photodiode 212. Distance measuring device 210 can capture the distance between photodiode 212 and each portion of physical object 120 using numerous different techniques. In one technique, distance measuring device 210 measures the time that elapses between the emission of the laser light from laser diode 211 and the moment when reflected light is received by photodiode 212, and it then calculates distance from that time measurement. An example of a novel laser distance measuring device and calibration technique is described in U.S. patent application Ser. No. 15/458,969, filed on Mar. 14, 2017, and titled "Using Integrated Silicon LED to Calibrate Phase Offset in Optical Receiver in Laser Range Finder," which is incorporated by reference herein.

To date, the prior art has not integrated a laser distance measuring device with a camera to capture spatial information for an object with sufficient accuracy to enable the types of applications described herein. The prior art also lacks a data structure for sending and receiving spatial metadata related to an image. The prior art also lacks the ability to capture, transmit, and modify spatial metadata and transactional metadata for a product that is captured in an image, which limits the detail that can be exchanged as part of an e-commerce transaction.

What is needed is the ability to capture spatial metadata with the captured image, to store spatial metadata with the image, and to later utilize the spatial metadata. What is further needed are applications that utilize such spatial metadata and transactional metadata that can be associated with the image.

SUMMARY OF THE INVENTION

The invention enables capturing an image as well as spatial metadata for the image, storing the image and the spatial metadata as a dimension extractable object, and utilizing the dimension extractable object. As used herein, "dimension extractable object" refers to an object that comprises 2D or 3D still or video image data and spatial metadata, such as some or all of the metadata described in Table 1, below. The dimensional extractable object optionally comprises transactional metadata, such as some or all of the metadata described in Table 2, below.

BRIEF DESCRIPTION OF THE DRAWINGS

FIG. 7 depicts an embodiment of the dimension extractable object within a JPEG file.

FIG. 17 depicts an embodiment of a method of calculating the velocity of a moving physical object using a video dimension extractable object captured using a moving or rotating image and distance capture device.

FIG. 26 depicts a server providing results to a computing device based on user data.

DETAILED DESCRIPTION OF THE PREFERRED EMBODIMENTS

I. Image Format

Figure 1:
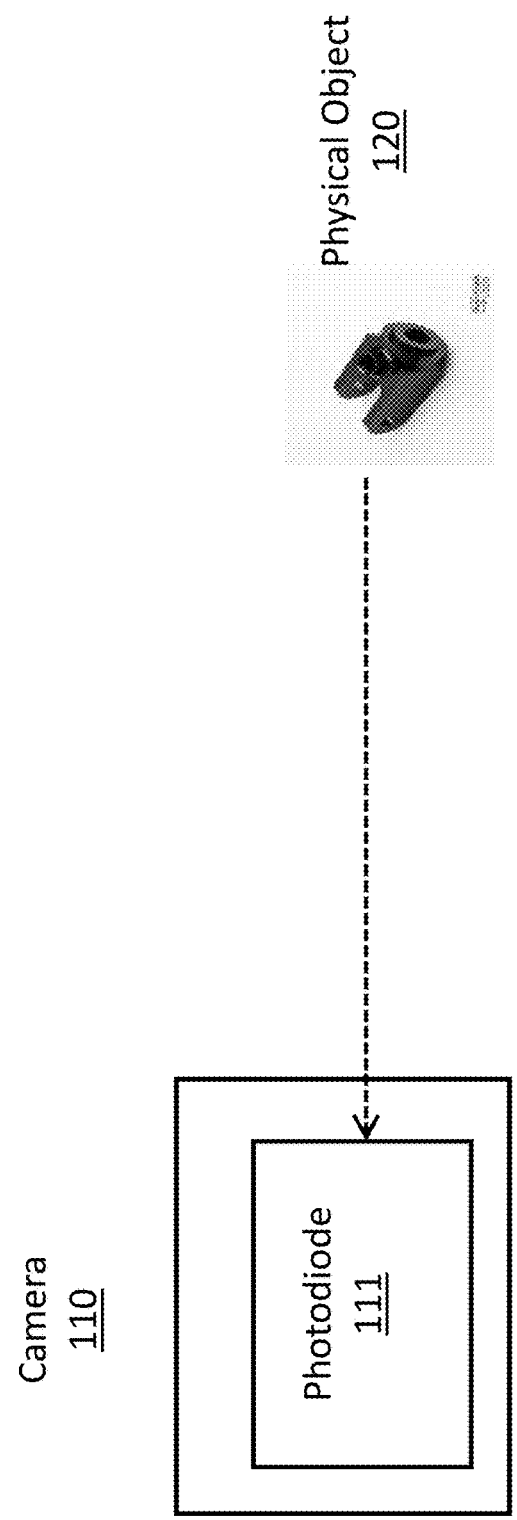
FIG. 1 depicts a prior art camera.
Figure 2:
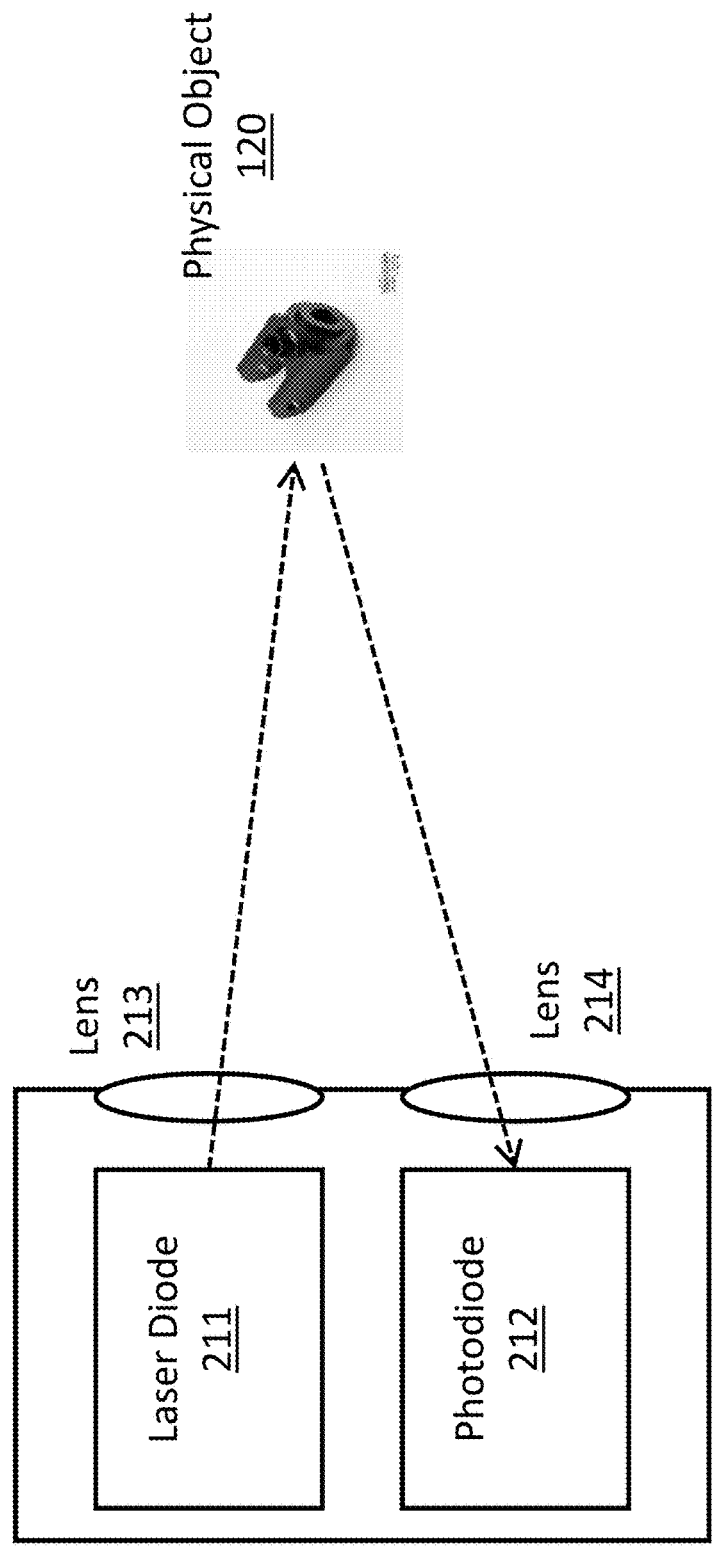
FIG. 2 depicts a prior art distance measuring device.
Figure 3:
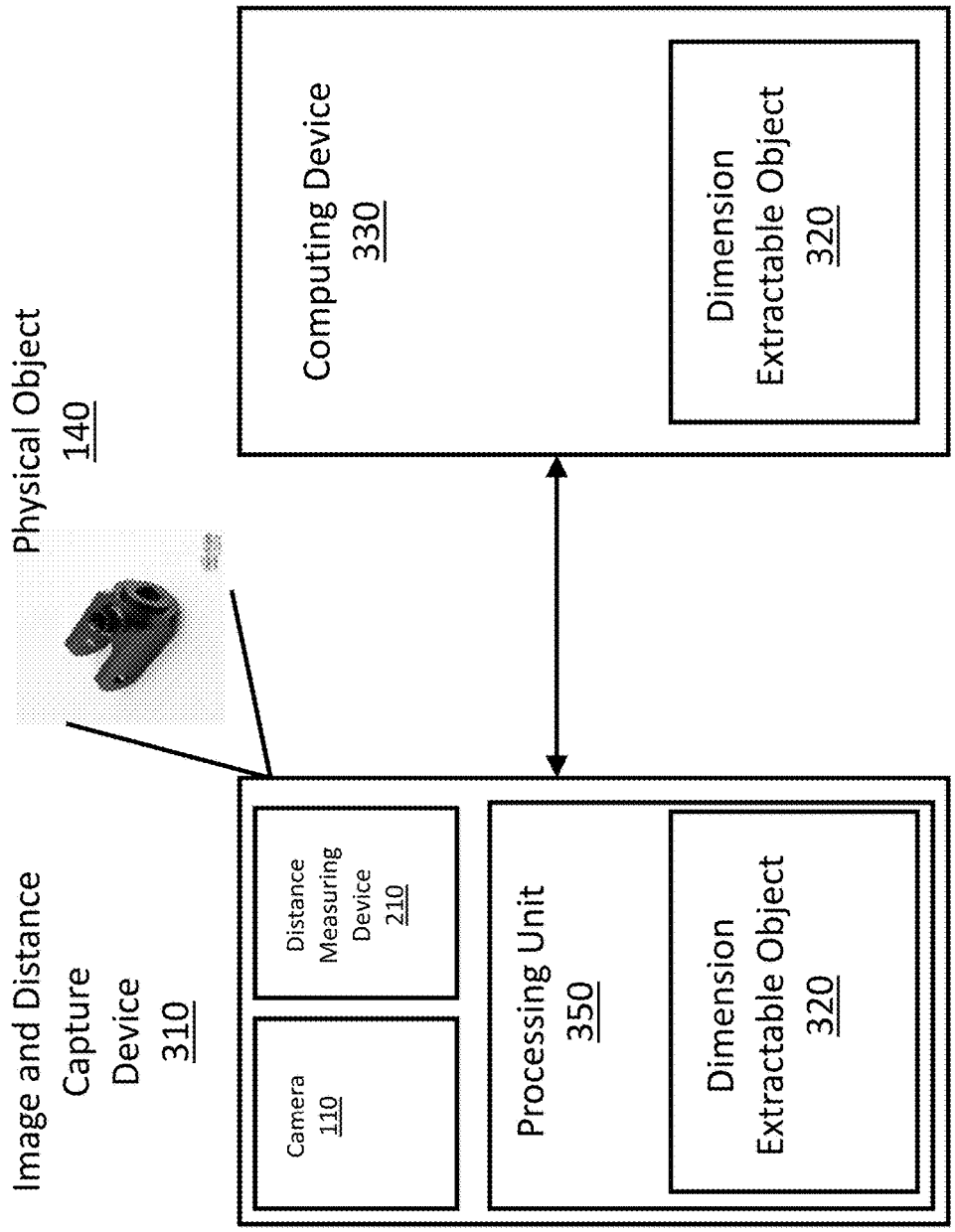
FIG. 3 depicts the creation of a dimension extractable object by an image and distance capture device.

Referring to FIG. 3, system 300 comprises image and distance capture device 310 and computing device 330. In this embodiment, image and distance capture device 310 comprises camera 110, distance measuring device 210, and processing unit 350. Image and distance capture device 310 captures an image of physical object 140 and spatial metadata for physical object 140, and processing unit 350 generates dimension extractable object 320.

Image and distance capture device 310 can transmit dimension extractable object 320 over a link or network to computing device 330, which can store, process, modify, transmit, or otherwise utilize dimension extractable object 320. For example, computing device 330 can provide e-commerce services that utilize the information stored in dimension extractable object.

Computing device 330 can comprise a server, laptop, desktop, mobile device, cloud system, or other known device. Computing device 330 comprises one or more processing units and one or more storage units and is capable of executing software code.

Figure 4:
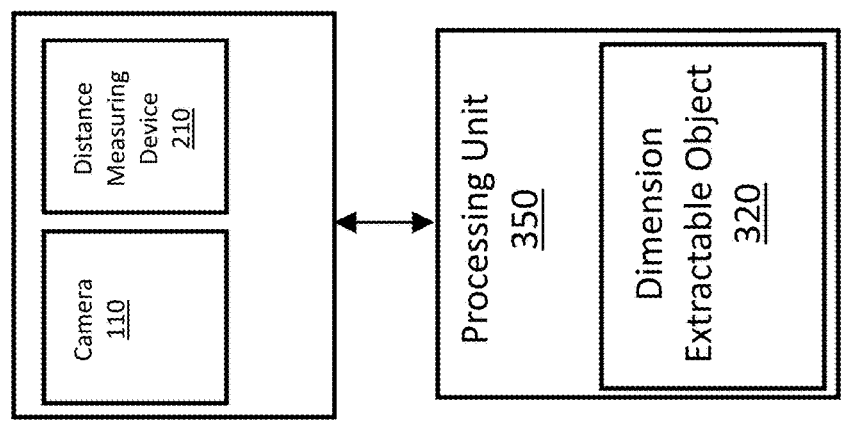
FIG. 4 depicts an alternative configuration for the image and distance capture device.

FIG. 4 depicts an alternative configuration. Here, processing unit 350 is external to image and distance capture device 310. In one embodiment, image and distance capture device 310 is a peripheral that plugs into processing unit 350, which might be a smartphone or other computing device. In another embodiment, image and distance capture device 310 and processing unit 350 communicate over a network or link, and processing unit 350 might be a server or cloud system.

It is to be understood that camera 110 and distance measuring device 210 can be part of a single physical structure, or they can be part of separate physical structures.

Figure 5:
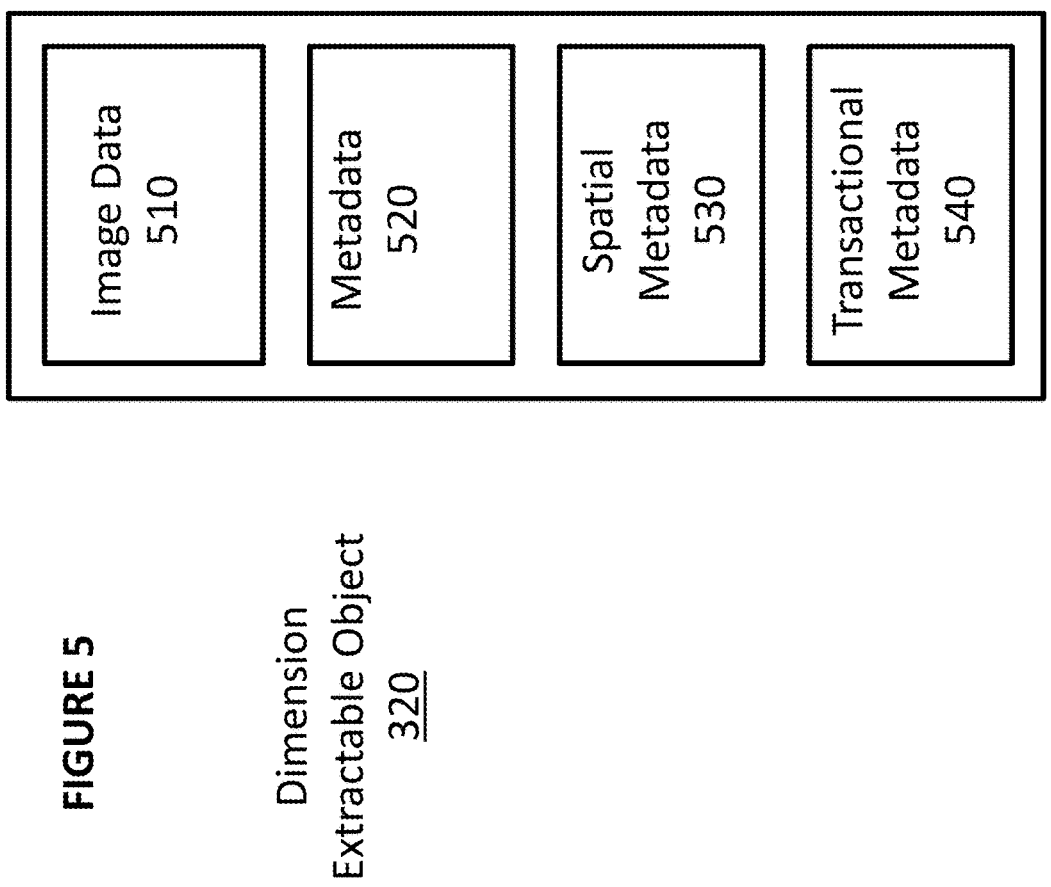
FIG. 5 depicts characteristics of the dimension extractable object.

FIG. 5 depicts additional aspects of dimension extractable object 320. Dimension extractable object 320 comprises image data 510, metadata 520, spatial metadata 530, and optionally, transactional metadata 540. Image data 510 comprises image data known in the prior art, such as the image data stored in JPEG, MP4, and 3D model files. Metadata 520 comprises metadata known in the prior art, such as date and time of capture, GPS location, etc. Spatial metadata 530 and transactional metadata 540 comprise metadata as described with reference to embodiments contained below.

In the preferred embodiments, spatial metadata 530 comprises data encoding the absolute distance of physical object 140 from a camera lens of image and distance capture device 310, as well as other metadata that enables a wide variety of photogrammetric and e-commerce applications. Photogrammetry is a science of making measurements from photographs and can apply to both still and moving (video) digital images.

Table 1 describes an exemplary embodiment of spatial metadata 530 within dimension extractable object 320 that can enable the applications described herein. The term "spatial metadata" encompasses any or all of the data described in Table 1, as well as any other data that represents or can be used to determine distance, dimensions, shapes, or contours of the captured physical object or that can used to increase the accuracy or precision of such determinations.

TABLE 1

EXEMPLARY SPATIAL METADATA 530 OF DIMENSION EXTRACTABLE OBJECT 320

| Element | Description |
| --- | --- |
| Identifier/ Classification | A unique alphanumeric identification string<br>Part of the identification is used for classification<br>Extensible - (a) possible to have multiple hierarchical categories for classification; (b) possible to have reference (link) to related dimension extractable object |

TABLE 1-continued

EXEMPLARY SPATIAL METADATA 530 OF DIMENSION EXTRACTABLE OBJECT 320

| Element | Description |
| --- | --- |
| Distance | May be in any standard or arbitrary measurement unit |
|  | Millimeter + phase shift + calibration data |
|  | Frequency + number of periods |
|  | There is no requirement to interpret the data as a standard distance. |
|  | The data can be specified in terms of phase shift, frequency, and calibration if so desired. |
|  | One or more points in the image, must be paired with the image position data. |
| Image position | In any coordinate system or at pre-defined points in the image. |
|  | Coordinate system: cartesian, polar, complex plane. |
|  | Pre-defined: (center, mid-left, mid-right) where each has a specific definition relative to the center/edges of the image |
|  | One or more points in the image, must be paired with the distance data. |
|  | May include image position data as before and/or after lens model correction. |
| Lens model | Lens model includes distortion and zoom. |
|  | The lens model can be equation based, e.g. empirical polynomial fitting, or physics based model. |
|  | The lens model can be look-up table based. |
| Image sequence | Reference images for stitched dimension extractable object model- |
|  | May be a pointer to multiple images that interact with the current image. |
|  | May include information of the entire sequence of images necessary to reproduce the whole view. |
|  | May include any data relevant to reproducing the stitching algorithm used in the global image model |
| Global map | For stitched dimension extractable object model- |
|  | May include thumbnail of the whole view (global map). The global map may include metadata on the all points that exist in the 2D image/3D object model |
|  | The (point, distance) data for the global image model may be included in each image. |
| Camera angular velocity | Raw data from gyroscope |
|  | May include pointer to reference image in a sequence of images used to create the global image model (see Global image sequence). |
| Camera linear velocity | Raw data from accelerometer |
|  | May include pointer to reference image in a sequence of images used to create the global image model (see Global image sequence). |
| Camera tilt position | 3-axis tilt angle calculated from accelerometer/gyro data. |
|  | May include pointer to reference image in a sequence of images used to create the global image model (see Global image sequence). |
| Camera velocity | Velocity of camera calculated from accelerometer/GPS data |
|  | May include pointer to reference image in a sequence of images used to create the global image model (see Global image sequence). |
| Embedded EXIF data | Already included in many digital images. |
|  | EXIF format typically includes all relevant camera setting data |
| Auxiliary sensor data | Include any other sensor data that may be important in downstream application. |
|  | Temperature, humidity, anemometer readings |
|  | GPS lock information |
|  | Cell phone tower location |
| Accuracy/ Precision | Include data related to the accuracy of distance measurement. |
|  | Number of samples and statistics (sigma, variance) |
|  | Sampling time |

Figure 6:
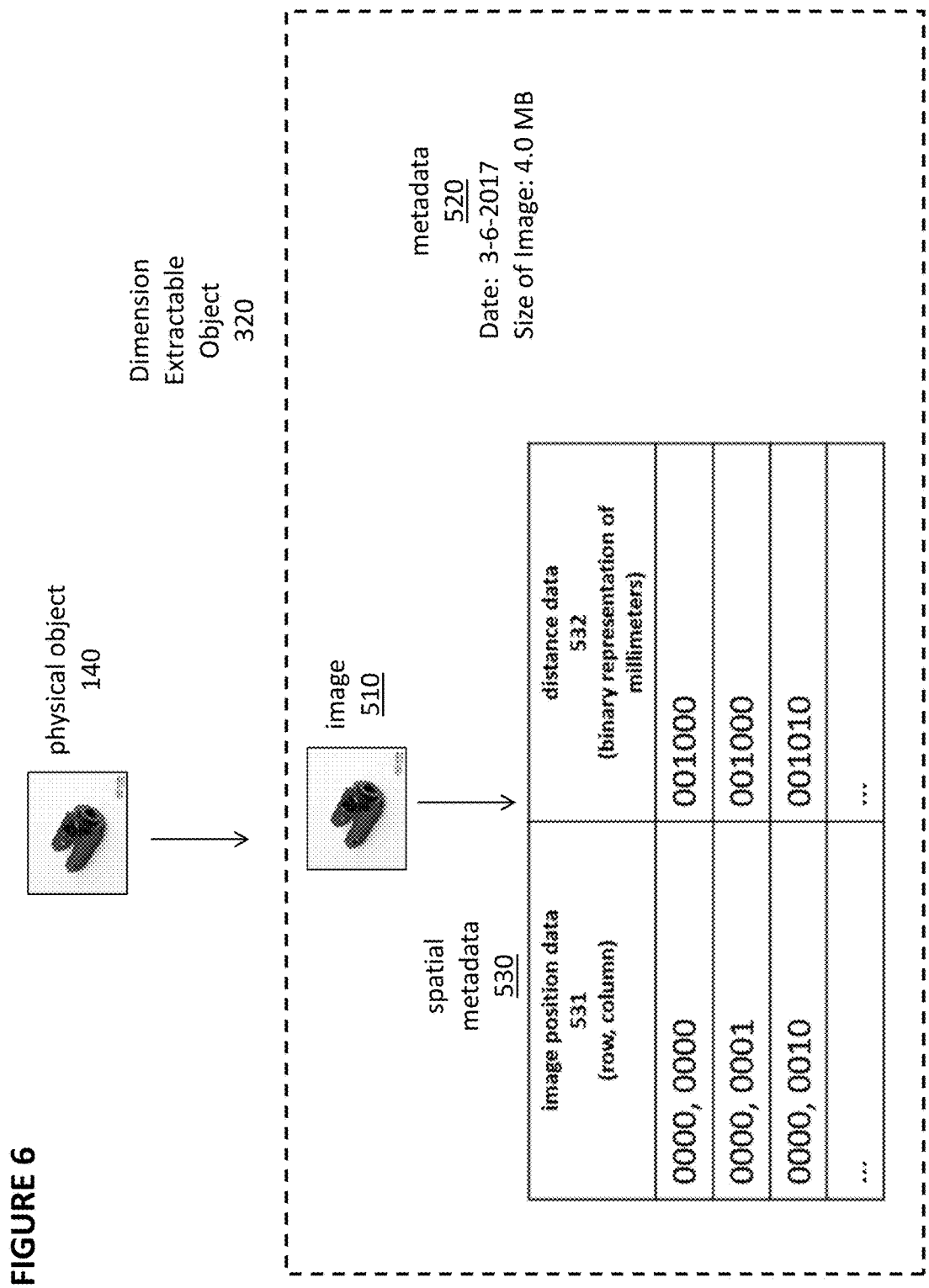
FIG. 6 depicts an example of distance data within a dimension extractable object.

A simple example of spatial metadata 530 is shown in FIG. 6. Processing unit 350 generates dimension extractable object 320, which comprises image 510 of physical object 140 captured by image and distance capture device 310. Image and distance capture device 310 and processing unit 350 also generate metadata 520, such as date and file size information, and spatial metadata 530, which here comprises image position data 531, and distance data 532. Image position data 531 is the location of distance measurement within image 510, here expressed as row and column numbers. Distance data 532 is the distance, at the time image 510 was captured, between a specific portion of distance capture device 310, such as lens 213, and the portion of physical object 140 corresponding to that particular pixel in image 510.

Dimension extractable object 320 optionally can utilize known file and data structure formats as long as such file and data structure formats can accommodate spatial metadata 530.

For example, FIG. 7 depicts the structure of an exemplary image file 700. Image file 700 in this example is based on the prior art JPEG file format. Image file 700 comprises numerous fields, one of which is field 710, which in this example is the APPn field within the JPEG file format. Field 710 comprises unspecified space that can be used by the implementer. In this embodiment, field 710 is used to store spatial metadata 530, such as some or all of the metadata set forth in Table 1. In this manner, image file 700 is an embodiment of dimension extractable object 320.

Figure 8:
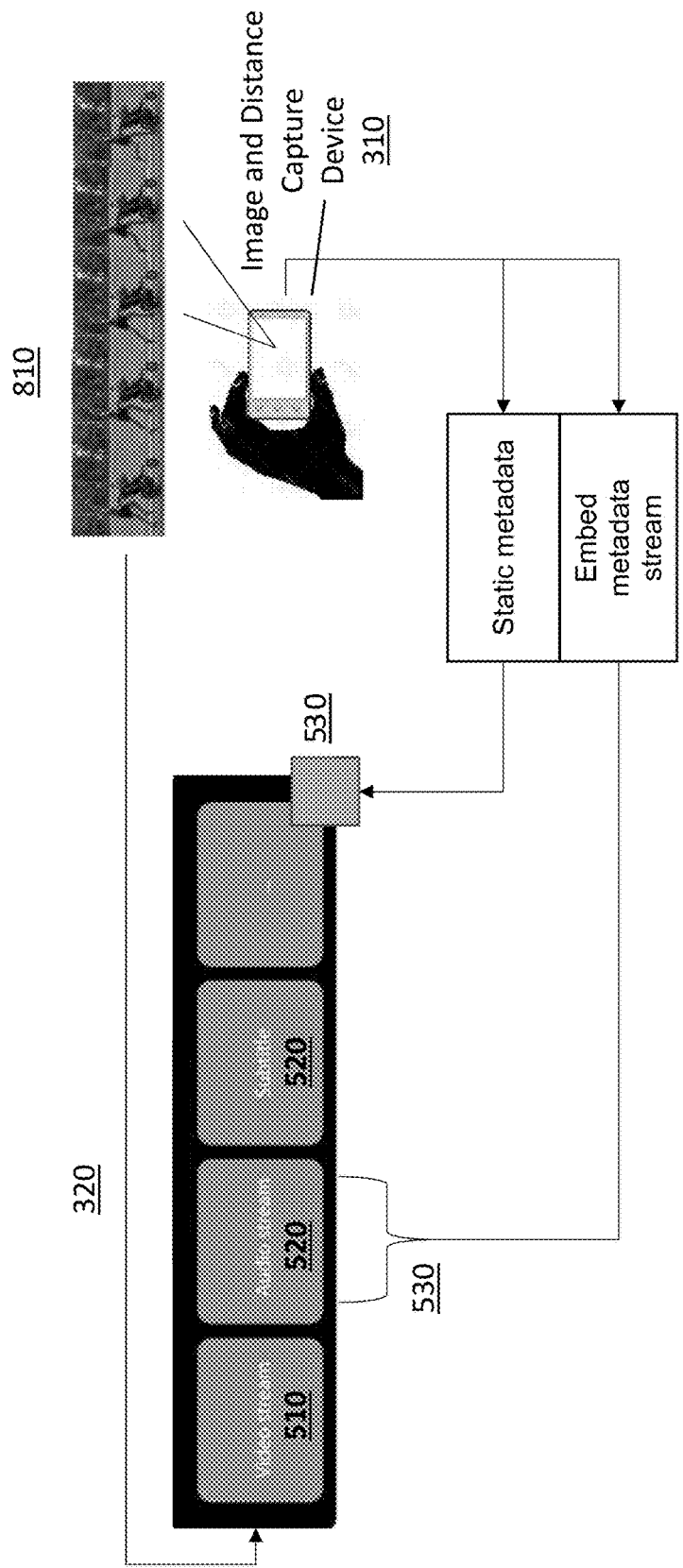
FIG. 8 depicts an embodiment of the dimension extractable object within a video file.

FIG. 8 depicts an embodiment for video data. Here, image and distance capture device 310 captures video data 810. Image and distance capture device 310 generates video dimension extractable object 320. Dimension extractable object 320 comprises a video stream (image data 510) and an audio stream and subtitles (metadata 520). In this embodiment, spatial metadata 530 is split into two portions, with each portion stored separately. The portion of dimension metadata 530 that applies to the entire video stream is stored in a metadata section within dimension extractable object 320.

The portion of dimension metadata 530 that is specific to a frame within the video stream is stored in a section of dimension extractable object that allows such metadata to be associated with the particular frame. For video container formats that support metadata streams or extensible streams, this portion of spatial metadata 530 is stored as encoded per-frame metadata in one or more metadata streams. For video container formats that do not support a metadata stream but support other types of overlay data streams, this portion of spatial metadata 530 is stored as encoded per-frame metadata in a supported overlay data stream.

Figure 9:
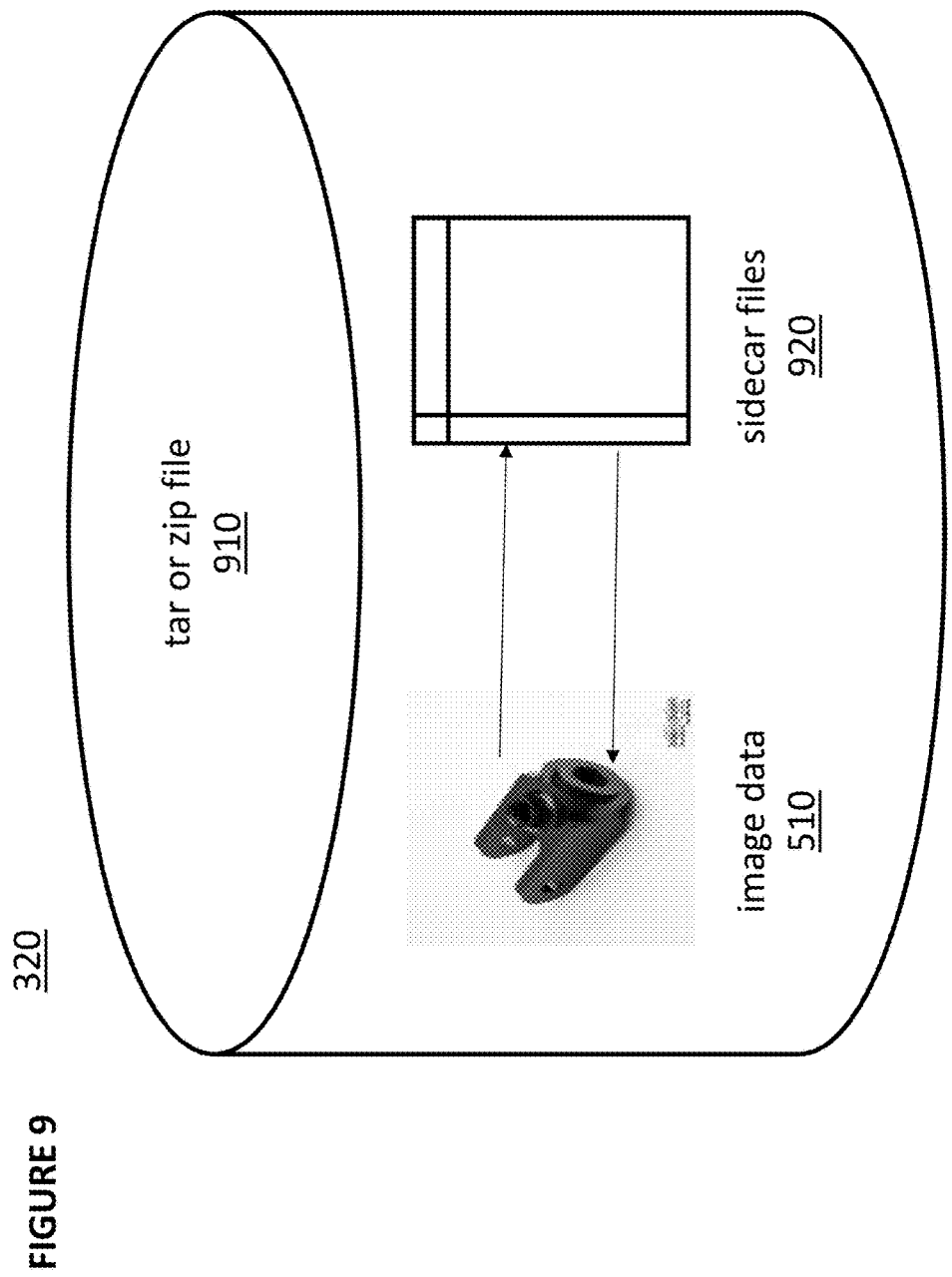
FIG. 9 depicts an embodiment of the dimension extractable object within a tar or zip archive file.

FIG. 9 depicts another embodiment of dimension extractable object 320. Here, dimension extractable object 320 comprises tar or zip file 910. An image is captured by image and distance capture device 310 of physical object 140 and is stored as image data 510 in tar or zip file 910. Spatial metadata 530 also is captured and stored in sidecar files 920. Sidecar files 920 also comprise pointers to image data 510 and vice versa.

Figure 10:
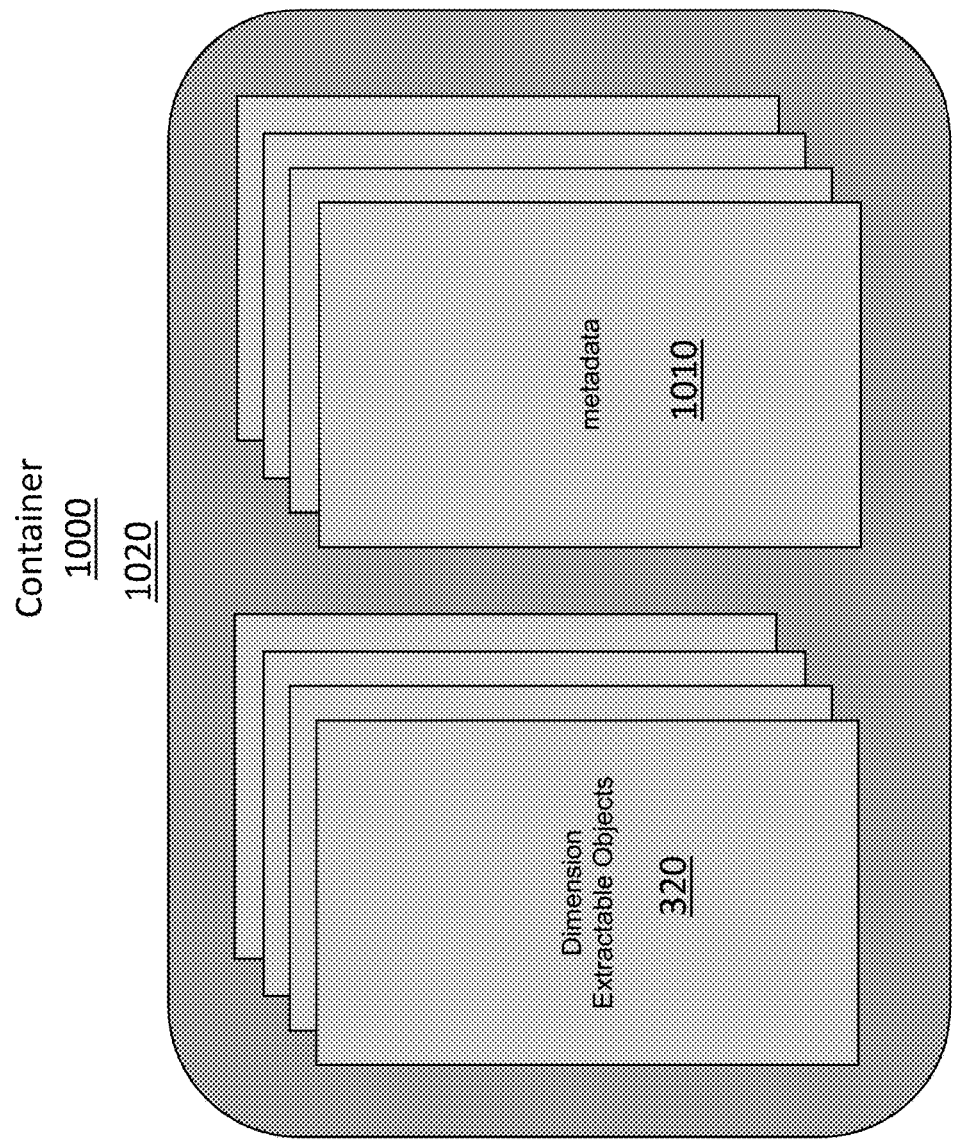
FIG. 10 depicts an embodiment of the dimension extractable object within a container.

FIG. 10 depicts another embodiment. Here, container 1000 is generated. Container 1000 comprises a plurality of dimension extractable objects 320. Each dimension extractable object 320 optionally is associated with other metadata 1010 that is stored in container 1000. Each dimension extractable object 320 comprises image data 510 (still, video, or 3D) and may or may not contain spatial metadata 530. In this embodiment, spatial metadata 530 can be stored outside of the dimension extractable object 320 itself and instead can be stored in one or more metadata sections 1010 within container 1000.

Container 1000 is an optimal format for storage of multiple images that are related to one another. Examples include:
Multiple images from a stitched-together scene;
A 3D model with the source images that were used to create the 3D model;
A video image with some key frames extracted as still images;
A 3D image of a main object and individual 3D images of components required to assemble the main object; and
A main image and post-processed or marked-up derivative images, for example, with key features extracted.

In this embodiment, container 1000 may include other containers 1000 of dimension extractable objects 320. That is, the structure of this embodiment can be nested to include multiple hierarchical levels.

Each container 1000 comprises a unique identification sequence 1020. A dimension extractable object 320 can reference any number of additional dimension extractable objects 320 using the unique identification sequences 1020. Unique identification sequence 1020 comprises a segment that encodes a classification for container 1000. The classification code may have multiple hierarchical levels.

Figure 11:
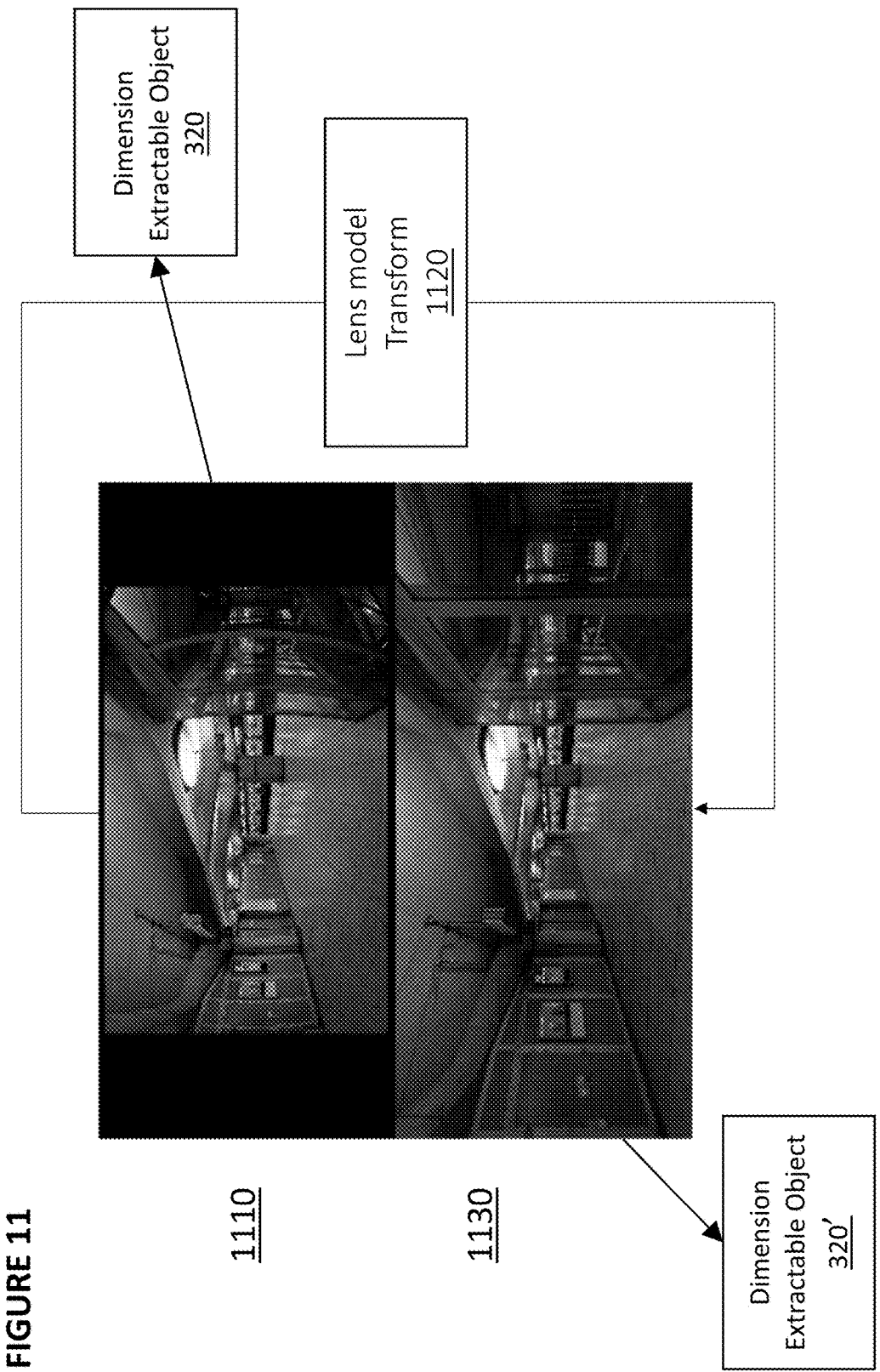
FIG. 11 depicts an embodiment of the dimension extractable object used in conjunction with a lens model transform.

FIG. 11 depicts an application that integrates a lens model transform function with a dimension extractable object 320. Here, image and distance capture device 310 captures image 1110 and spatial metadata 530 and generates dimension extractable object 320. Lens model transform 1120 (which optionally is an algorithm performed by a processing unit in image and distance capture device 310 or in computing device 330) performs a transformation on image 1110 to generate corrected image 1130, which is combined with spatial metadata 530 to generate a new dimension extractable object 320'.

Using this embodiment, a downstream application in computing device 330 can use lens model transform 1120 and spatial metadata 530, including distance information to an image point, to calculate the size of the physical object that was captured in the image. Features of interest in the image can be extracted by using image recognition and object detection algorithms.

By storing the lens model, the downstream application in computing device 330 can correct for a large physical object that is captured using a wide-angle lens (as was the case with image 1110). Using a wide-angle lens on image and distance capture device 310 allows distance measurements to be made at closer ranges, which will increase the accuracy and sampling rate of image and distance capture device 310.

Figure 12:
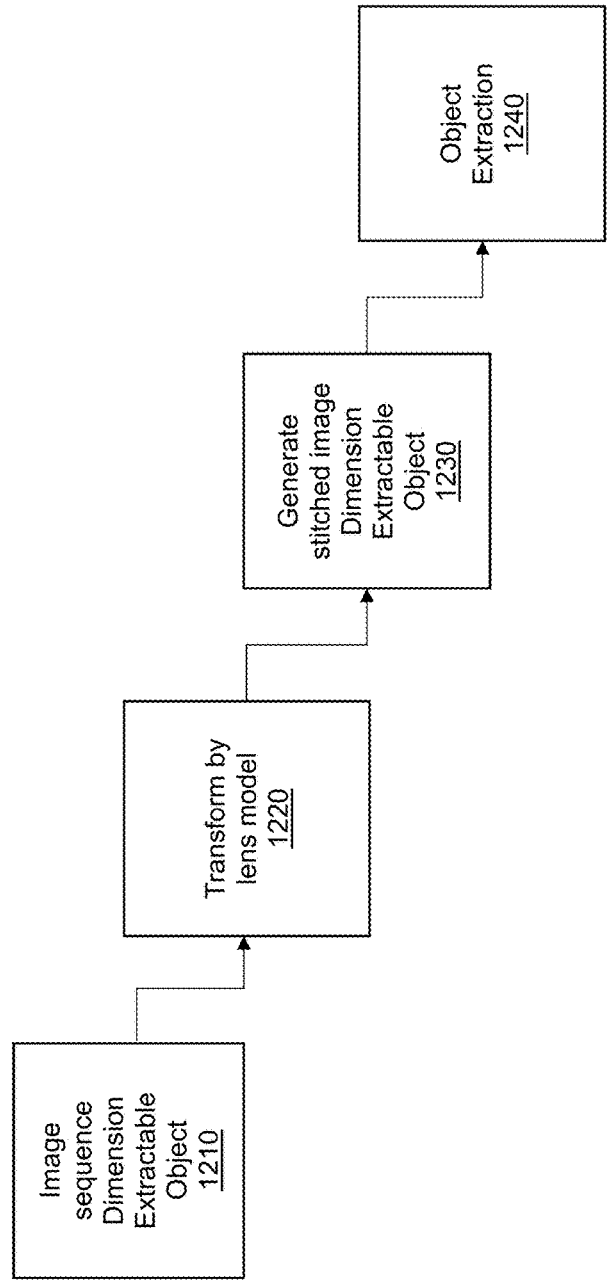
FIG. 12 depicts an embodiment of a method of generating a stitched-image dimension extractable object from a plurality of image dimension extractable objects.

FIG. 12 depicts a method that provides additional functionality based on the embodiment of FIG. 11. Method 1200 comprises multiple steps that together allows a sequence of still images to be stitched together.

In step 1210, image and distance capture device 310 captures a sequence of images at close range and generates a sequence of dimension extractable objects 320.

In step 1220, the lens model transform 1120 of FIG. 11 is performed on each image in the sequence of images.

In step 1230, image and distance capture device 310 or computing device 330 stitches together the sequence of transformed images. Even without any additional sensor data, the additional distance measurements contained in spatial metadata 530 will allow accurate stitching of the transformed images. Additional data collected from an accelerometer and gyroscope in image and distance capture device 310 can help make corrections to the position of the camera and can further improve the accuracy of the stitching process. Additional sensor data to calculate the camera tilt angle and position (accelerometer and gyro) assist in the creation of a 3D dimension extractable object 320 by (a) correcting for potential errors from stitching algorithm, and (b) reducing the number of images required to create the full 3D images. The multiplicity of distance measurements in overlapping images can be used generate accurate surface profile of the target object.

In step 1240, a new dimension extractable object 320 is generated to embody the stitched-together image and spatial metadata 530.

Figure 13:
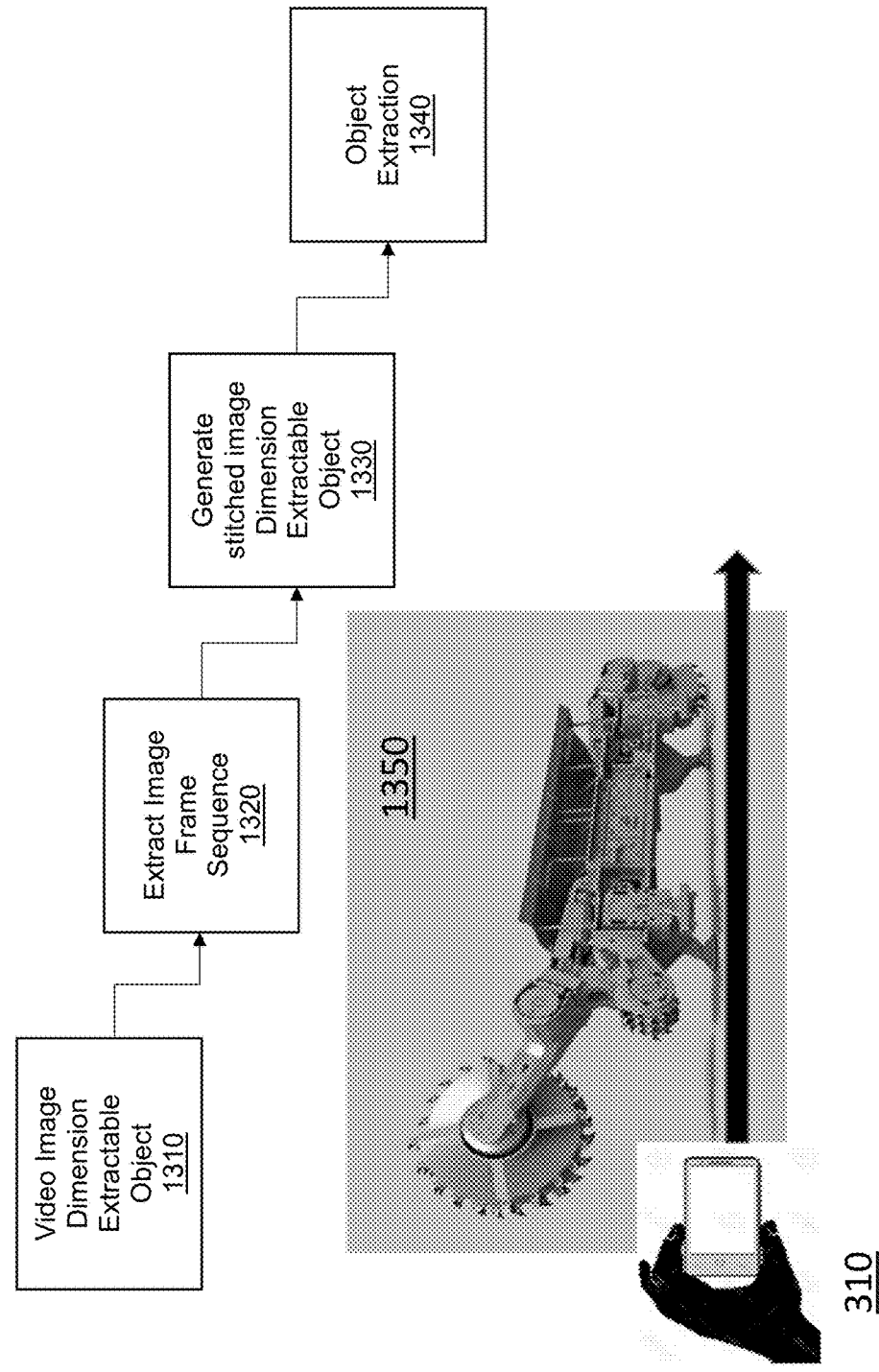
FIG. 13 depicts an embodiment of a method of generating a stitched-image dimension extractable object from a video dimension extractable object.

FIG. 13 depicts a method that utilizes an improved stitching capability for images extracted from video using spatial metadata 530.

In step 1310, video image dimension extractable object 320 is generated. For example, image and distance capture device 310 can record video as the user walks around the physical extent of physical object 1350.

In step 1320, a sequence of still images is extracted from the captured video stream.

In step 1330, the still images are stitched together using the same technique discussed previously with reference to FIG. 12.

In step 1340, a new dimension extractable object 320 is generated to embody the stitched-together image and spatial metadata 530. Thus, using the spatial metadata 530, a dimension extractable object comprising a single, stitched-together still image can be generated for a large physical object 1350 using a captured video stream of the object that enables extraction of object surface profile. The accuracy of this process can be improved through slower movement of image and distance capture device 310.

Figure 14:
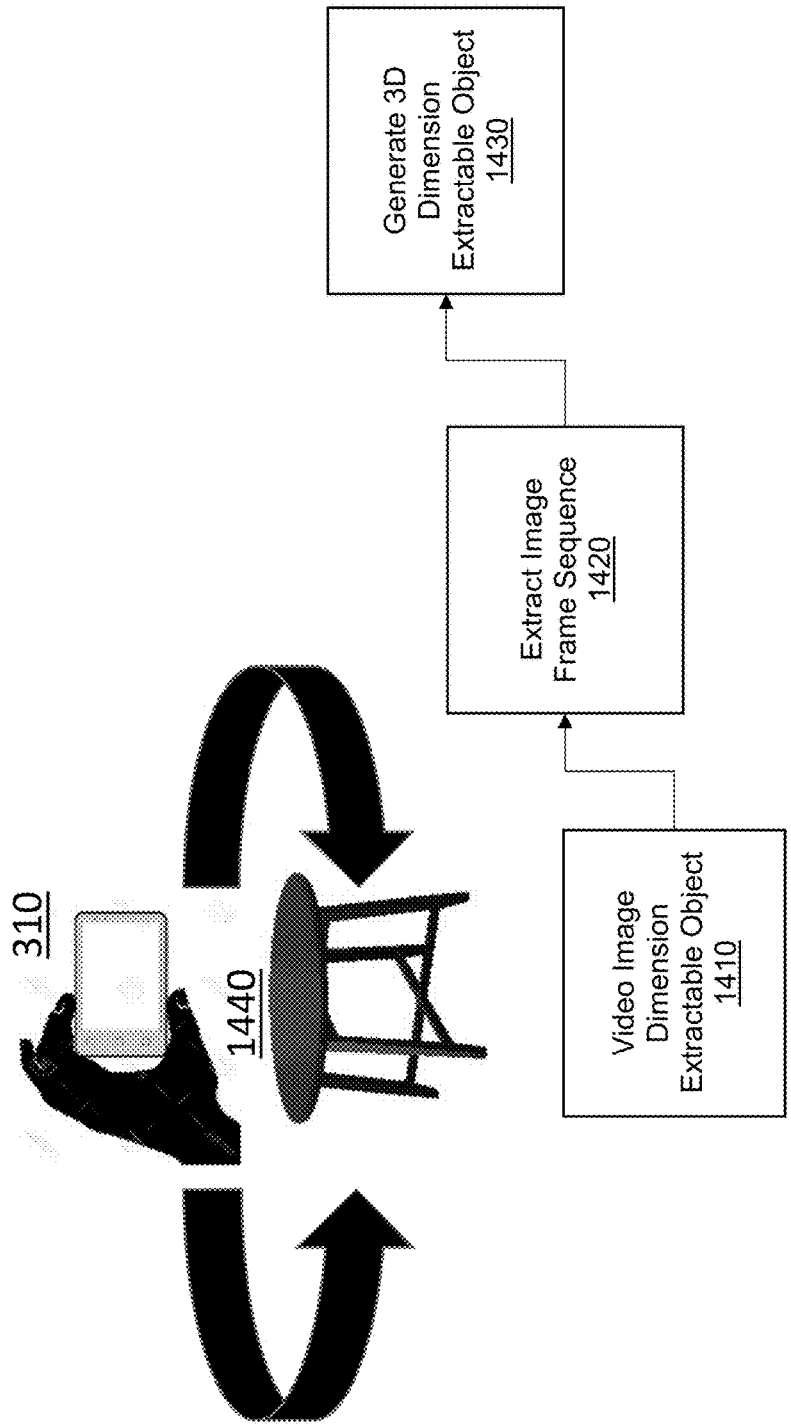
FIG. 14 depicts an embodiment of a method of generating a 3D model dimension extractable object from a video dimension extractable object.

FIG. 14 depicts a method for generating a 3D model of physical object 1440. In this method, a user hold image and distance capture device 310 and captures video of physical object 1440. For example, the user might walk around physical object 1440. If physical object 1440 is a room, then the user might stand in the center of the room and record video while facing the perimeter of the room and rotating.

In step 1410, image and distance capture device 310 captures video image dimension extractable object 1410.

In step 1420, a sequence of image frames is extracted from the video.

In step 1430, a 3D model dimension extractable object is generated from the sequence of image frames. Thus, a single video recording, stored as a video dimension extractable object 320, contains all data necessary to construct a 3D model.

Figure 15:
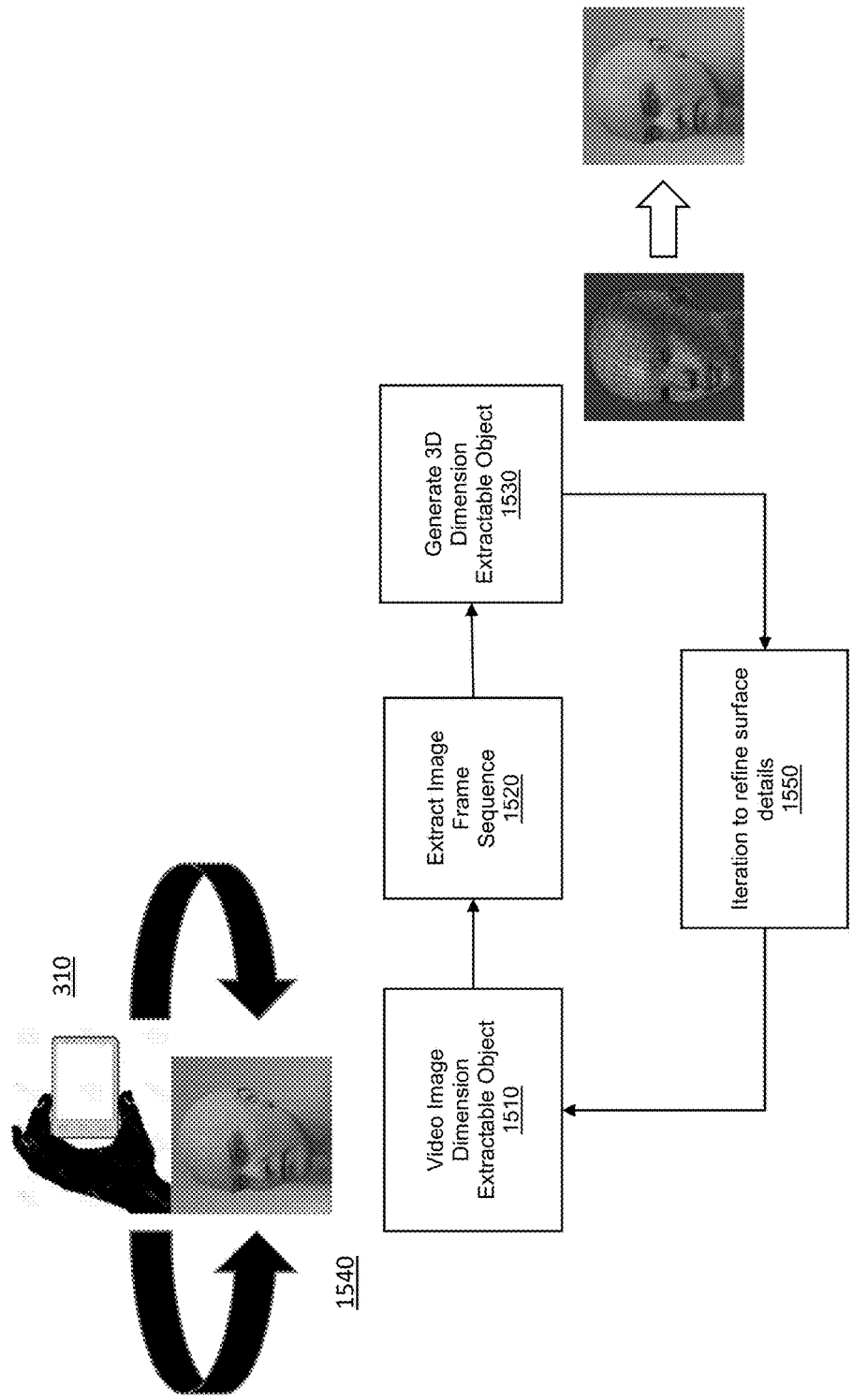
FIG. 15 depicts another embodiment of a method of generating a 3D model dimension extractable object from a video dimension extractable object.

FIG. 15 depicts a method 1500 for generating a 3D model of physical object 1540. The first three steps are the same as in method 1400 described previously with reference to FIG. 14. In step 1510, image and distance capture device 310 captures video image dimension extractable object 320. In step 1520, a sequence of image frames is extracted from the video. In step 1530, a 3D model dimension extractable object is generated from the sequence of image frames. Thus, a single video recording, stored as a video dimension extractable object 320, contains all data necessary to construct a 3D model.

In step 1540, for objects with complex surface details, additional dimension extractable objects can be used to progressively include more surface details in the 3D model.

Figure 16:
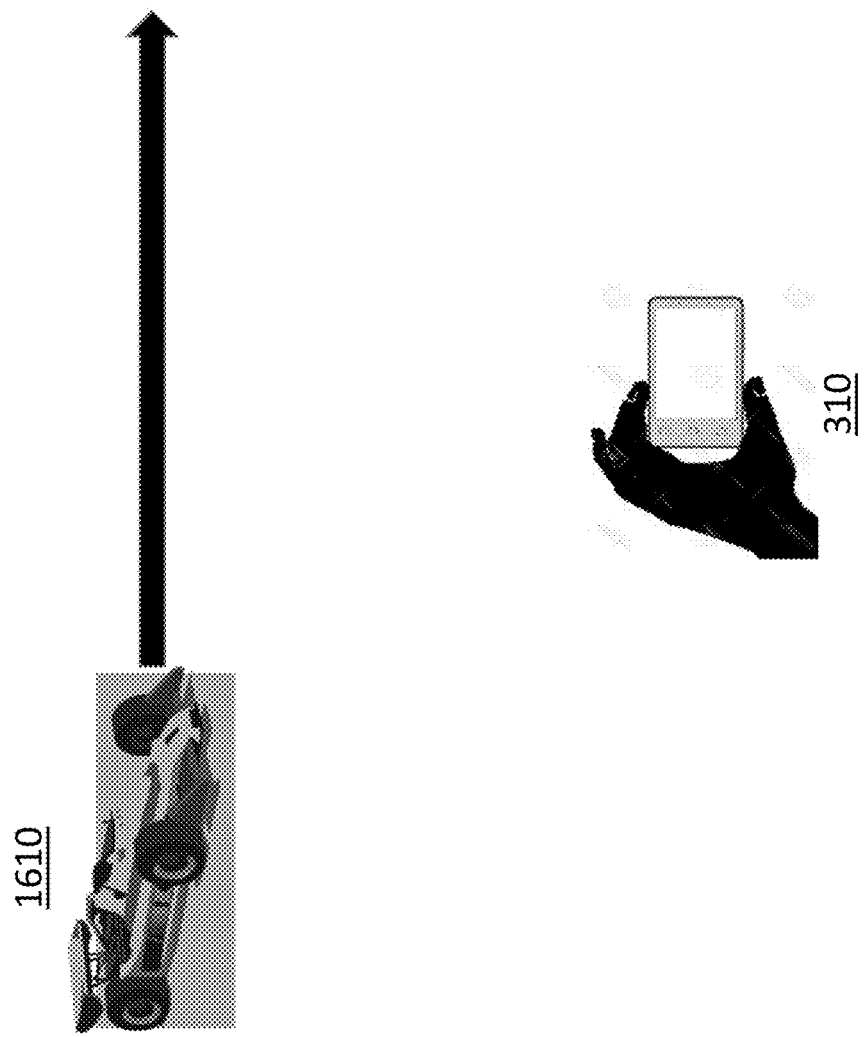
FIG. 16 depicts an embodiment of a method of calculating the velocity of a moving physical object using a video dimension extractable object captured using a stationary image and distance capture device.

With reference to FIGS. 16 and 17, a video dimension extractable object 320 can be used to calculate the velocity of a moving physical object 1610.

In FIG. 16, image capturing device 110 is stationary, and moving physical object 1610 crosses the field of view and rangefinder range. Multiple distance measurement points and time metadata, which is stored as spatial metadata 530 in dimension extractable object 320, can be used to calculate the velocity of moving physical object 1610.

In FIG. 17, image capturing device 110 is moving or rotating. Multiple distance measurement points, time metadata, and accelerometer and gyroscope metadata, which is stored as spatial metadata 530 in dimension extractable object 320, can be used to calculate the velocity of moving physical object 1610.

In each of the embodiments described above, spatial metadata 530 in dimension extractable object 320 will allow a user operating computing device 130 to be provided with accurate dimension information for the physical object that is the subject of the captured images. For example, if the physical object is a room, spatial metadata 530 will allow the user to be provided with the exact dimensions of the room, including all size measurements and angles. If the physical object is a car, spatial metadata 530 will allow the user to be provided with the exact dimensions of each visible surface and aspect of the car. If the physical object is a landscape, spatial metadata 530 will allow the user to be provided with the exact distances between objects in the landscape (e.g., distance between two trees in a landscape plan).

II. E-Commerce Applications of Dimension Extractable Objects

There are numerous benefits in using dimension extractable objects for e-commerce. Optionally, metadata that is particularly useful for e-commerce can be added to a dimension extractable object. With reference again to FIG. 5, dimension extractable object 320 optionally comprises transactional metadata 540. Table 2 describes an exemplary embodiment of transactional metadata 540 within dimension extractable object 320 that can enable the applications described herein. The term "transactional metadata" encompasses any or all of the data described in Table 2, as well as any other data that is useful to a commercial transaction involving the product that is the subject of dimension extractable object 320.

TABLE 2

EXEMPLARY TRANSACTIONAL METADATA 540 OF DIMENSION EXTRACTABLE OBJECT 320

| Element | Description |
| --- | --- |
| Project related | Min, max total cost |
| | Min, max cost of material |
| | Min number required. |
| | Type of material |
| | Min, max cost for shipping |
| | Material - color, type (e.g. bamboo, maple, Brazilian teak, 300 thread cotton) |
| | Accuracy specifications |
| | Validity date |
| Bid related | Limit geographical location for bids |
| | Job due/required by date |
| | Payment methods |
| Contractual | Return/restocking requirements |
| | Bonus/penalty provisions for early/late completion |
| | Intellectual property registrations - trademark, copyright, patent information |
| Supplier Ratings | Relevant rating system, reviews |
| | Recommendations, references |
| Buyer Ratings | Relevant rating system, reviews |
| Shipping related | Fragile/non-Fragile |
| | Ship method, conditions |
| | Others freight constraints |
| Transaction related | Maximum number of bids accepted. |
| | Optimization criteria - examples include cost, quality, precision, yield, reputation. |
| Informational links | Links to public/private webs page |
| | Links to shared file on a serve |

Each metadata field within transactional metadata 540 (such as the metadata listed in Table 2, above) may encode additional data that categorizes the level confidentiality of the data. For example, in a completely open transaction, all fields are public to the parties involved in the transaction. However, adding more specific confidentiality levels can improve the flow of the transaction process being handled by software applications. For example, a buyer may make the minimum cost public, but may wish to hide the maximum cost. In general, completely open delineation of the requirements is often not desired by one or both of the parties.

Figure 18:
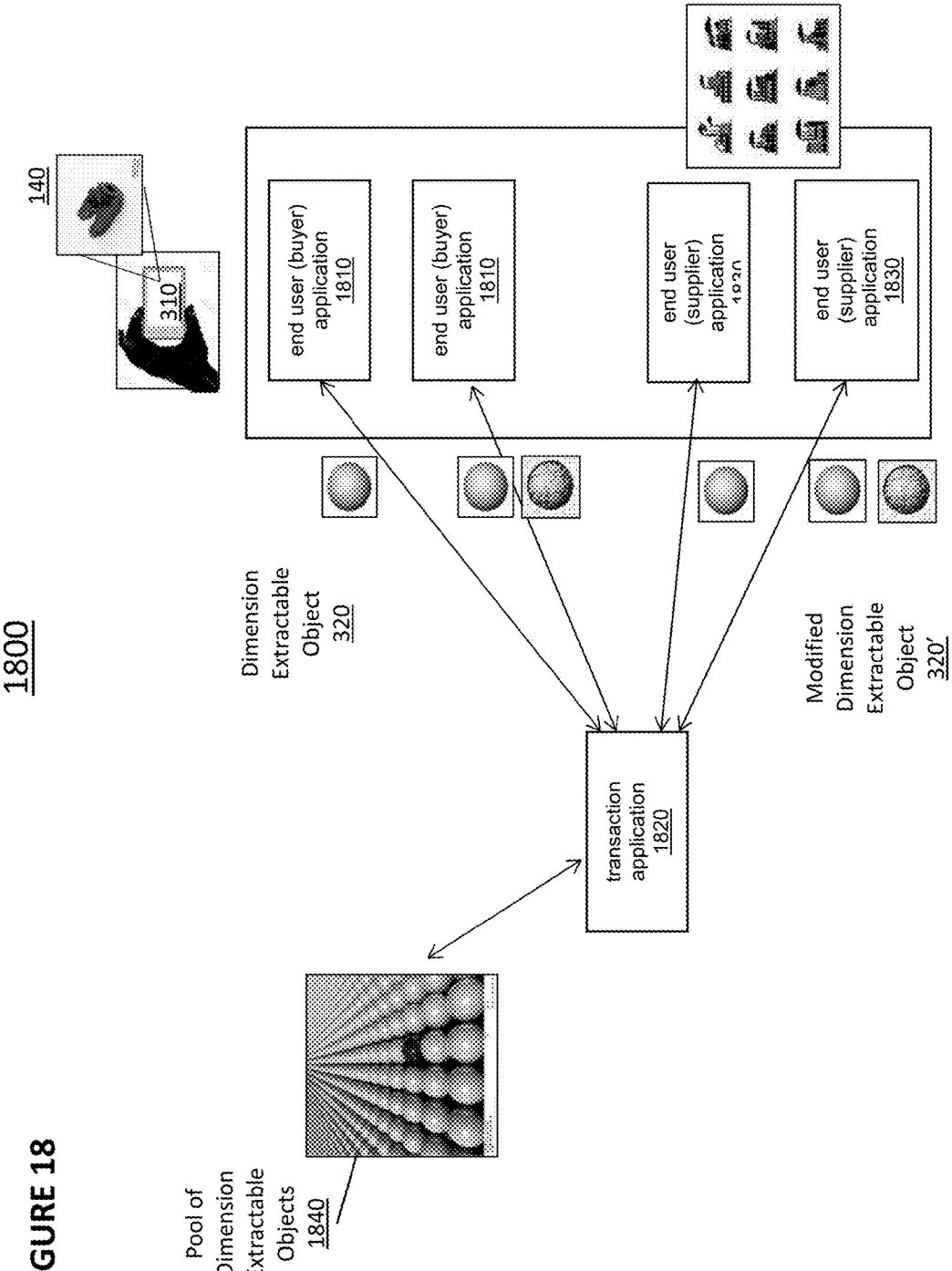
FIG. 18 depicts an embodiment of a system and method for performing e-commerce using dimension extractable objects.

FIG. 18 depicts an embodiment of e-commerce system and method 1800. An end user, which can be the buyer or the supplier, operates an end user application 1810 (buyer) or 1830 (supplier) in conjunction with image and distance capture device 310 to capture image data and dimension data from physical object 140. The end user application 1810/1830 generates dimension extractable object 320, which includes the image data and spatial metadata 530 as well as transactional metadata 540 such as some or all of the metadata described in Table 2, above. The end user applications 1810/1830 transmits and receives dimension extractable object 320 to and from transaction application 1820. The end user application 1810/1830 and transaction application 1820 may modify dimension extractable object 320 by modifying spatial metadata 530 and/or transactional metadata 540 field or adding/removing dimension extractable object(s) 320 within the original dimension extractable object container. The modified dimension extractable object 320' is treated as any other dimension extractable object.

Figure 19:
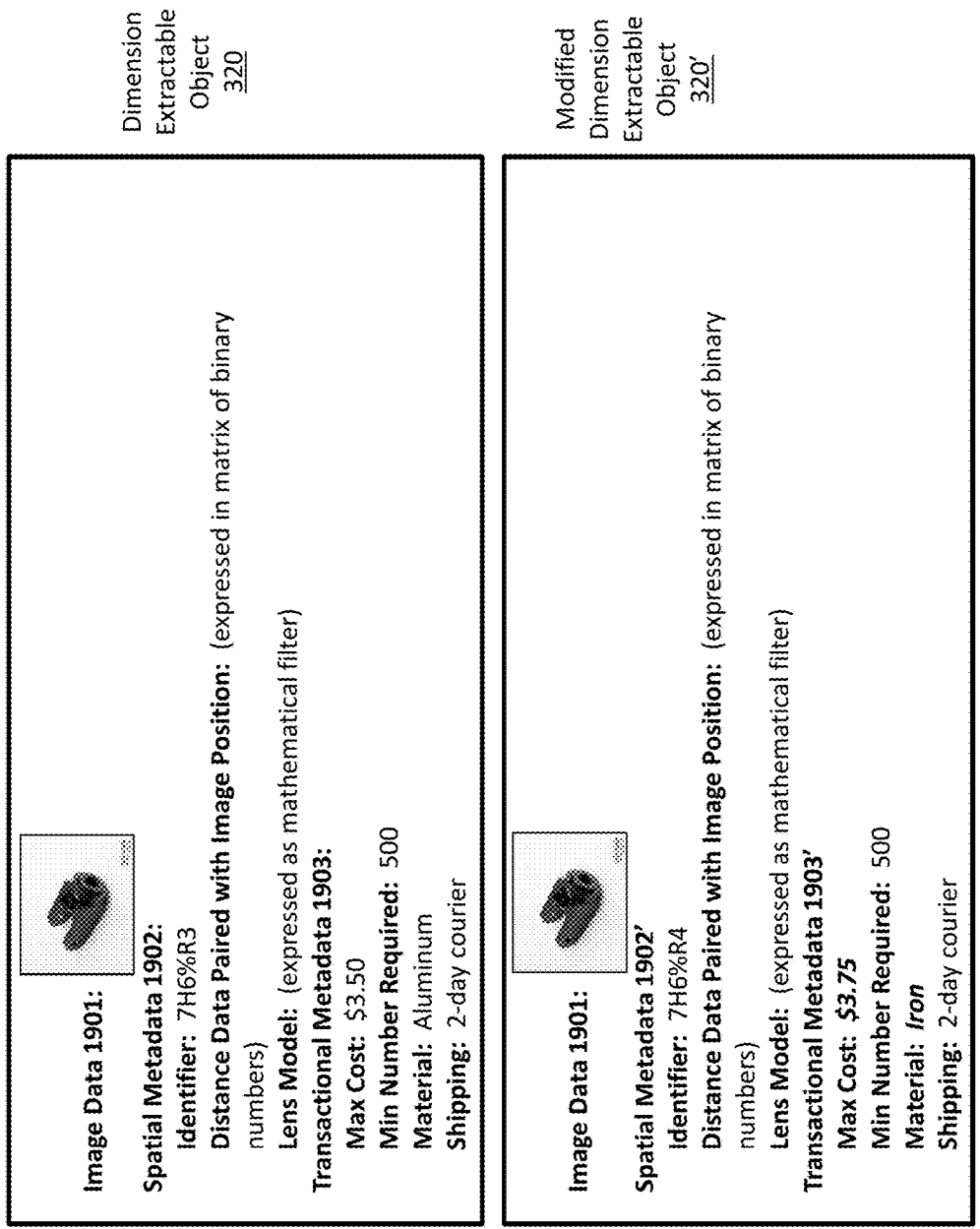
FIG. 19 depicts an example of a dimension extractable object and a modified dimension extractable object.

An example of dimension extractable object 320 is depicted in FIG. 19. Dimension extractable object 320 comprises image data 1901, spatial metadata 1902, and transactional metadata 1903. In this example, the buyer wishes to purchase the product shown in image data 1901. The product is further defined by spatial metadata 1902 (input by the buyer), which in this example includes an identifier of "7H6% R3"; distance data paired with image position (expressed in matrix of binary numbers), such as a distance measurement for each pixel in the image, where the distance is the measurement from image and distance capture device 310 to that portion of physical object 140; and a lens model, and transactional metadata 1903 (input by the buyer), which in this example includes a maximum cost per unit of $3.50; the minimum number of the product required of 500; a material of aluminum, and shipping of 2-day by courier.

An example of dimension extractable object 320' is shown in FIG. 19. Dimension extractable object 320' comprises image data 1901 (which has not changed compared to dimension extractable object 320), spatial metadata 1902', and transactional metadata 1903'. In this example, spatial metadata 1902' is the same as spatial metadata 1902. In other instances, a buyer or seller might change spatial metadata 1902 to create spatial metadata 1902', for example, if a seller wanted to offer a buyer a product that was similar to but not identical the product represented by spatial metadata 1902. Transactional metadata 1903' is identical to transactional metadata 1903 except that the supplier has changed the maximum cost per unit to $3.75 and has changed the material to iron.

Transaction application 1820 can establish communication between buyer and supplier, or buyer application 1810 and supplier application 1830, through the internet and can complete the contractual agreement for the job if both parties agree to the terms indicated in dimension extractable object 320. One of ordinary skill in the art will appreciate that numerous rounds of dimension extractable objects can be exchanged between the buyer and the seller, similar to the manner in which drafts of contracts can be exchanged in a negotiation.

Transaction application 1820 optionally operates an event-driven engine that responds to transactional events using machine-learning or other computational algorithms. For example, a dimension extractable object registration or retrieval by a buyer can trigger an advertising widget for a related product.

One of ordinary skill in the art will understand that any number of individuals might make modifications to the same dimension extractable object, or that multiple modified versions of the same dimension extractable object may be created. The examples of the Figures included herein are merely illustrative.

Figure 20:
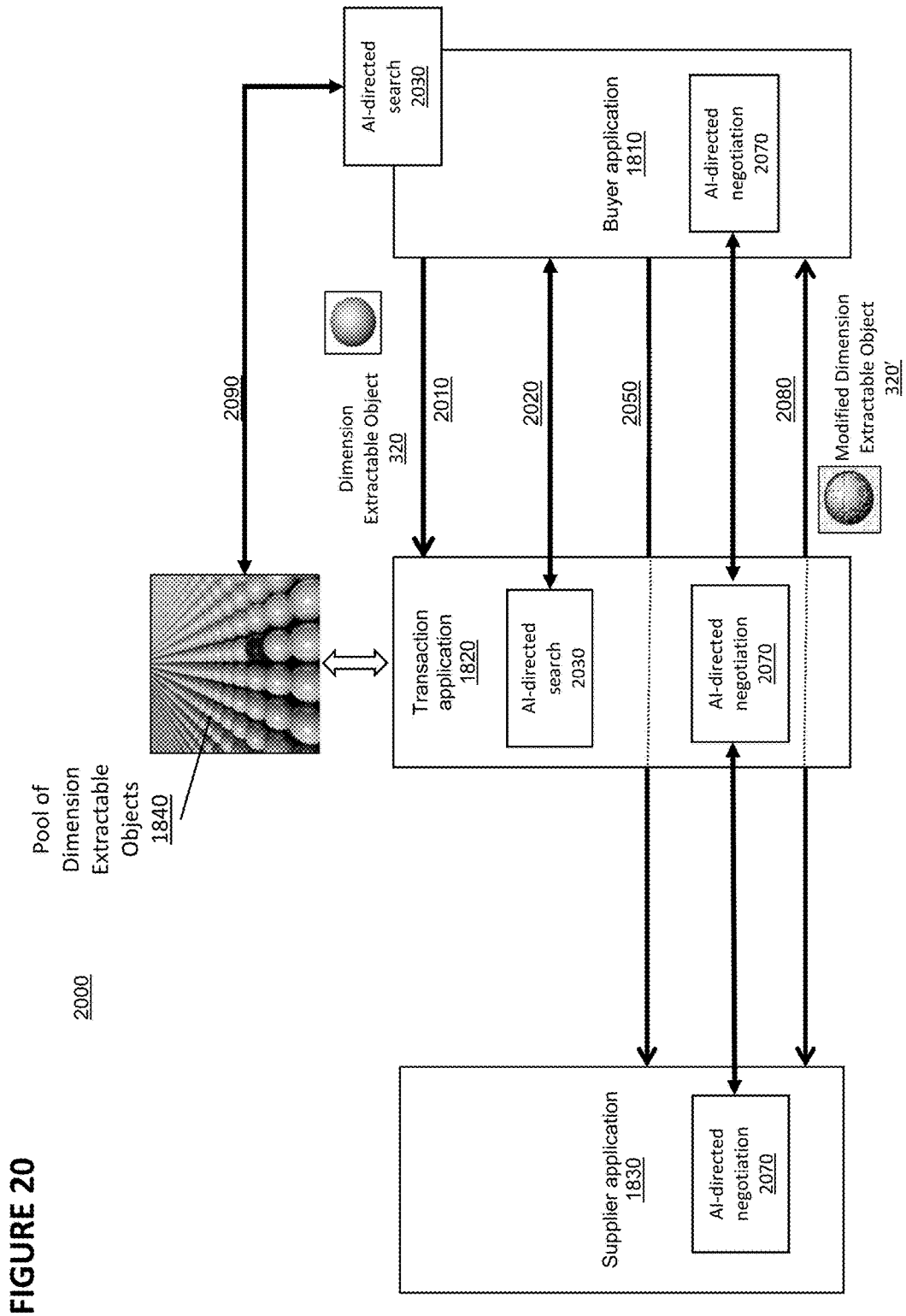
FIG. 20 depicts an example of a transaction initiated by a buyer application.

FIG. 20 depicts an embodiment of e-commerce system and method 2000 implementing an e-commerce transaction initiated by the buyer. The buyer application 1810 registers a dimension extractable object 320 through transaction application 1820 and requests a search for possible supplier matches through search engine 2030, which may be a part of transaction application 1820. In other cases, buyer application 1810 may request direct access to the pool of dimension extractable objects 1840 through an application interface 2090 to implement a customized search algorithm. The search responses 2020 are sent back to the buyer, who selects suppliers and contacts the potential supplier through the transaction application 1820. Once the supplier application 1830 receives the request for attention from the buyer application 1310, a communication path 2080 is established through transaction application 1820 for further negotiation on the terms, as necessary. Applications 1810, 1820, and 1830 may also conduct the initial phases of the negotiation algorithmically through an artificial intelligence (AI)-directed negotiation engine 2070 based on private/public e-commerce metadata.

Figure 21:
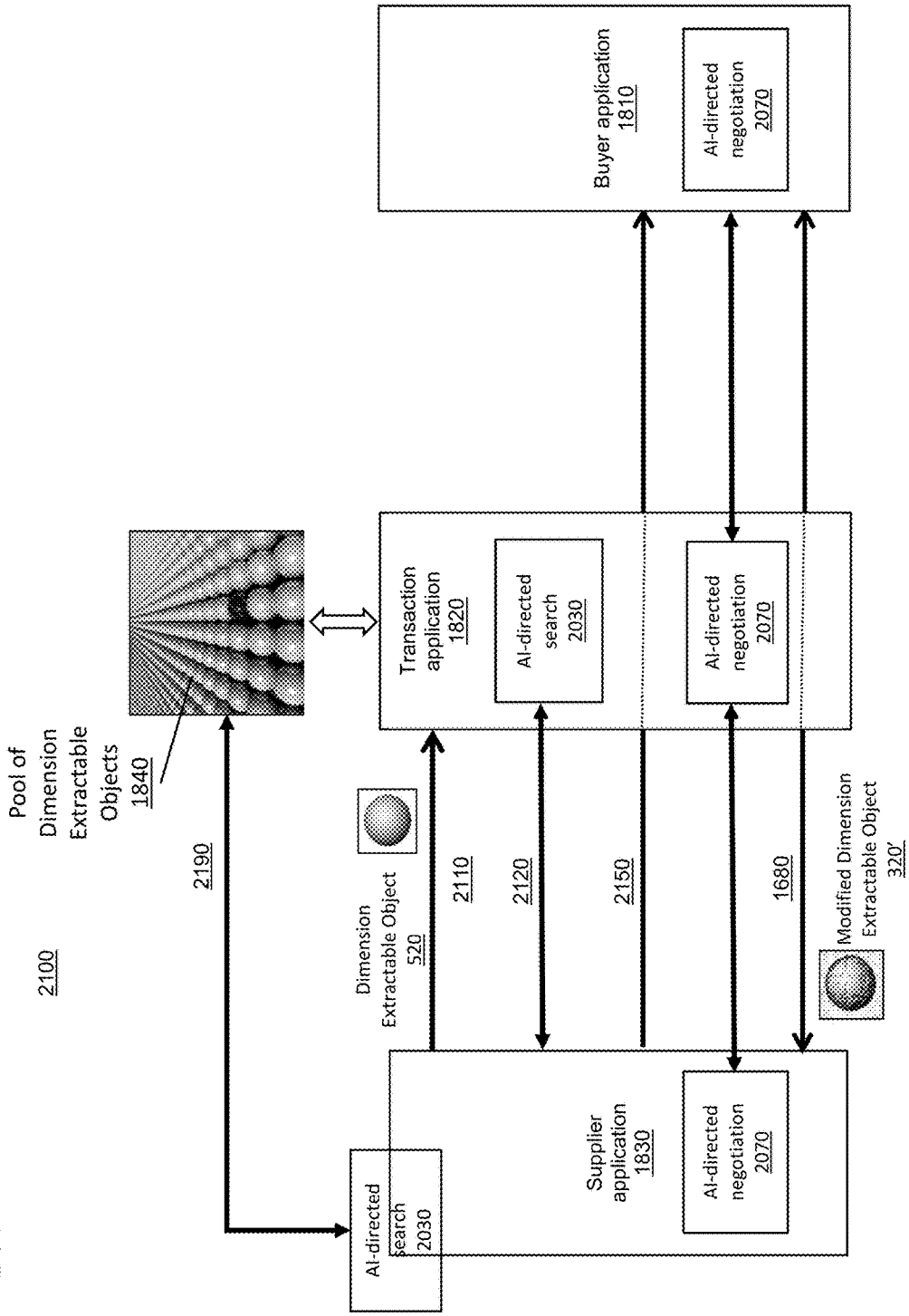
FIG. 21 depicts an example of a transaction initiated by a seller application.

FIG. 21 depicts an embodiment of e-commerce system and method 1800 implementing an e-commerce transaction initiated by the supplier. The supplier application 1830 registers a dimension extractable object 320 through the transaction application 1820 and requests a search for possible buyer matches through the search engine 2030, which may be a part of transaction application 1820. In other cases, supplier application 1830 may request direct access to the pool of dimension extractable objects 1840 through an application interface 2190 to implement a customized search algorithm. The search responses 2120 are sent back to the supplier, who selects and markets the product through the transaction application 1820. Once the buyer application 1810 receives the request for attention from the seller application 1830, a communication path 2180 is established through the transaction application for further negotiation on the terms, as necessary. Applications 1810, 1820, and 1830 may also conduct the initial phases of the negotiation algorithmically through a AI-directed negotiation engine 2070 based on private/public e-commerce metadata.

Figure 22:
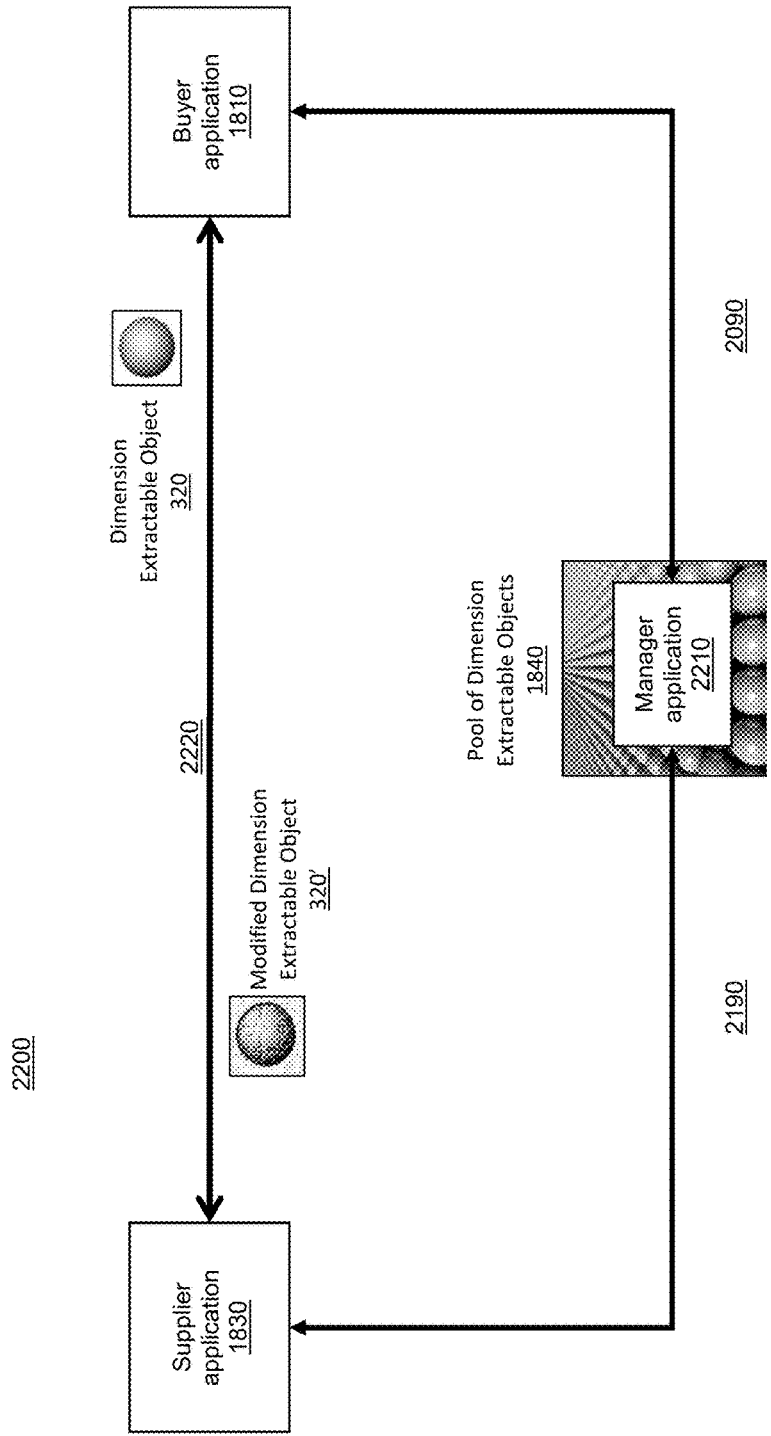
FIG. 22 depicts an example of a transaction involving a manager application.

FIG. 22 shows an embodiment of e-commerce system and method 2200 where buyer application 1810 and supplier application 1830 communicate directly through application interfaces 2190 and 2090, respectively, to manager application 2210, which manages pool of dimension extractable objects 1840. Manager application 2210 provides services commonly performed by storage servers, such as implementing access controls and monitoring access. The application interface functions performed over application interfaces 2190 and 2090 may include some functions ascribed to transaction application 1820 in previous examples, such as adding, removing, and returning qualified applications as directed by supplier and buyer applications. The communications between the end-users (buyer and seller) are conducted independently of manager application 2210.

Figure 23:
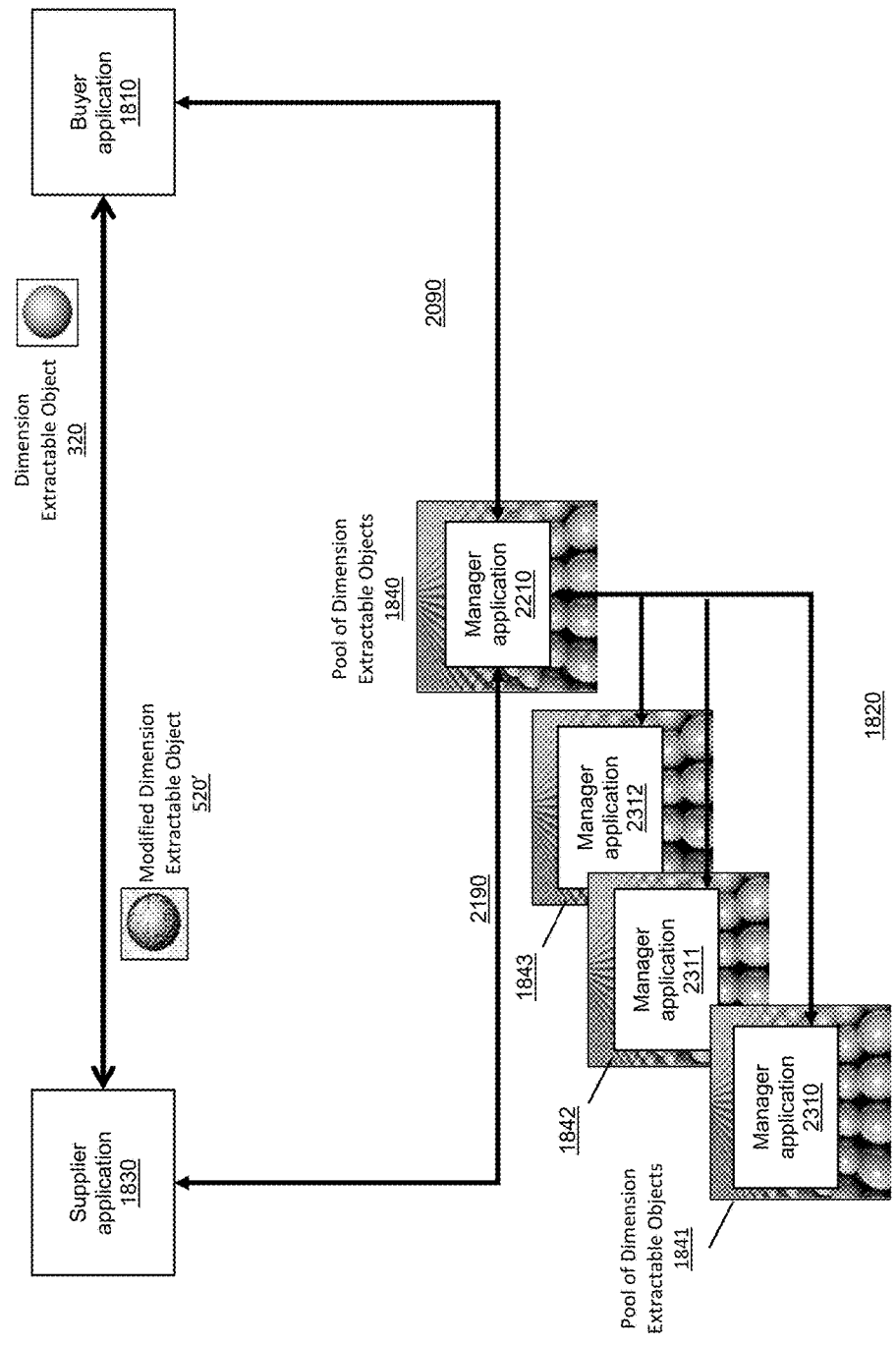
FIG. 23 depicts another example of a transaction involving a manager application.

FIG. 23 shows an embodiment of e-commerce system and method 2300, which is a variation of the embodiment 2200 of FIG. 22. As in FIG. 22, buyer application 1810 and the supplier application 1830 communicate directly through an application interface to manager application 2210, which manages pool of dimension extractable objects 1840. The communications between the end-users (buyer and seller) are conducted independently of manager application 2210. Manager application 2210 has the ability to provide access for buyer application 1810 and supplier application 1830 to a plurality of manager applications (such as exemplary manager applications 2310, 2311, and 2312), each of which manages a pool of dimension extractable objects (such as exemplary pool of dimension extractable objects 1841, 1842, and 1843, respectively) Thus, pools of dimension extractable objects may be distributed across many servers. Any number of additional manager applications and pools of dimension extractable objects may exist. Any given pool of dimension extractable objects may have private or public access. The manager application controlling each pool will have a standard interface for communicating with the other manager applications and pools. Thus, instead of buyer application 1810 and supplier application 1830 accessing pool of dimension extractable objects 1841 or manager application 2310 directly, access is provided through manager application 2210. Manager application 2210 will then provide access to one or more pools of dimension extractable objects depending on its access rights.

Thus, in one implementation of e-commerce system and method 2300, the operator of manager application 2210 may negotiate or pay for access to various other manager applications and/or pools and market and sell such access to supplier application 1830 and/or buyer application 1810. For instance, a large retail provider might have access to a greater number of manager applications and pools than a smaller retail provider.

In another implementation of e-commerce system and method 2300, the cost of maintaining, collecting, and marketing a pool of dimension extractable objects can be funded by membership fees levied on buyers, suppliers, brokers, or others, or on a "per transaction" fee, or using any other pricing model. Under this model, the fact that manager application 2210 acts as a gateway to manager applications 2310, 2311, and 2312 will make is easier for such a fee system to be imposed on buyers, suppliers, or other users who wish to access pools 1841, 1842, and 1843.

Figure 24:
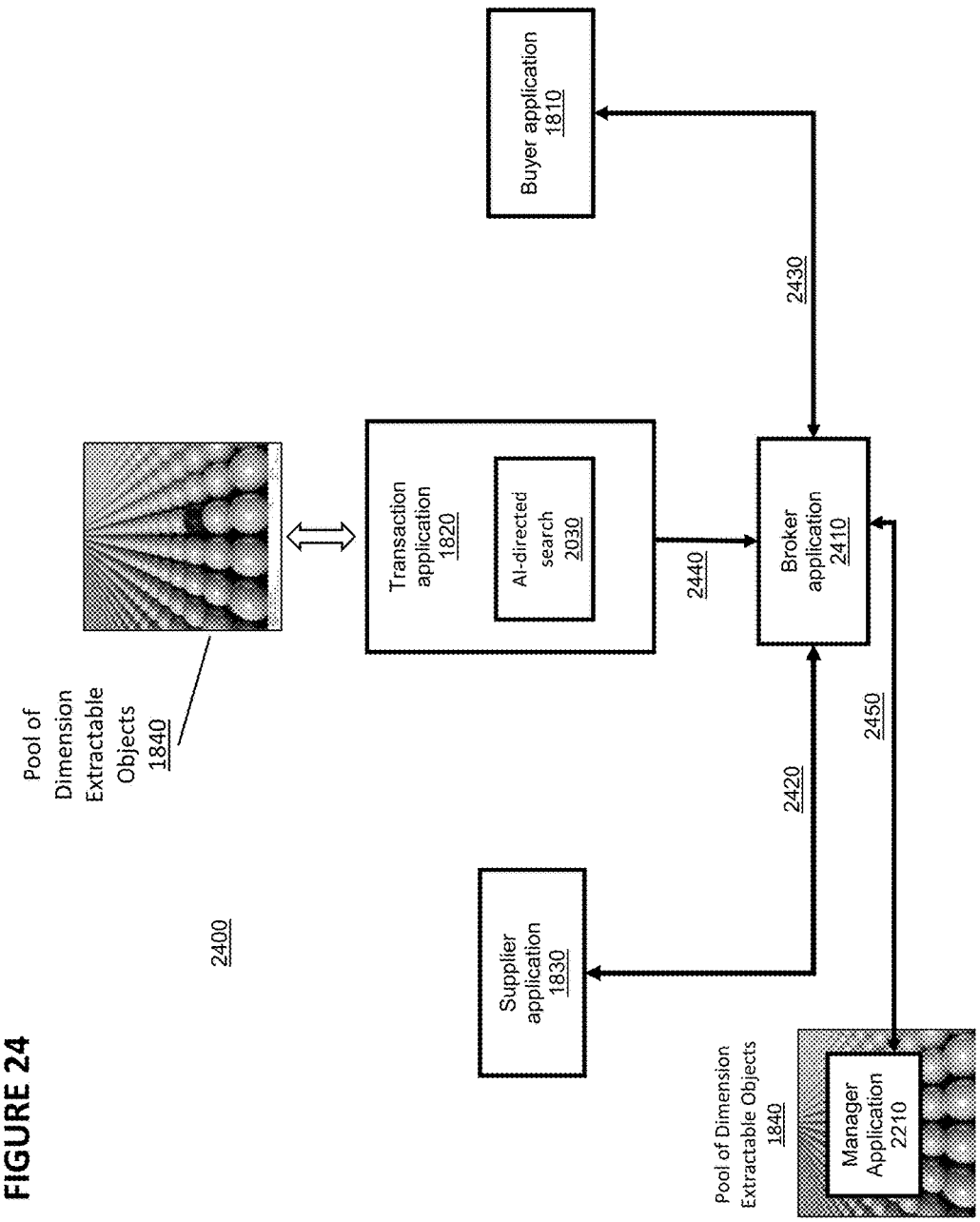
FIG. 24 depicts an example of a transaction involving a broker application.

FIG. 24 shows an embodiment of e-commerce system and method 2400. A broker operates broker application 2410 that communicates with buyer application 1810 through communication path 2420 and with supplier application 1830 through communication path 2430. To access pool of dimension extractable objects 1840, broker application 2410 communicates with transaction application 1820 through communication path 2430 or with manager application 1810 through application interface 2440.

One benefit of system and method 2400 is that broker application 2410 can provide an additional layer of security for transaction application 1820 and pool of dimension extractable objects 1840. This architecture also might be useful if pool of dimension extractable objects 1840 are proprietary in nature and if its owner does not wish them to be publicly accessible System and method 2400 also may be particularly useful in a situation where the operator of broker application has specialized expertise that itself provides value to potential transactions, as might be the case if the operator of broker application 2410 is an interior designer, architect, systems designer, assembly line designer, or other professional with specialized knowledge and experience in design or manufacturing. For example, broker application 2410 might have access rights to exemplary manager application 2210 and pool 1840 through application interface 2450, where manager application 2210 specializes in managing objects within a particular niche area (e.g., customized home furniture). Broker application 2410 can have access rights to any number of other manager applications and pools.

This architecture also would allow a broker to modify dimension extractable objects to suit the needs of the buyer, seller, or other user. For example, if a buyer uses buyer application 1810 to create dimension extractable object 1840, broker can review the contents of dimension extractable object 1840, and modify it into dimension extractable objet 1841 using the broker's expertise in a given field. Broker application 2410 can then find relevant objects managed by manager application 1810 and can then provide them or provide a modified version of them to buyer application 1810.

An example of such a scenario would be if the broker is an interior designer. The buyer can create a dimension extractable object 320 using buyer application, and might specify a space within his home that he wishes to decorate. The broker can then review an image of the space and the associated dimensions and can then choose dimension extractable objects from manager application 2210 (and perhaps other manager applications), which in this example might be suppliers of furniture, artwork, etc. The broker might then create a new container that includes the original dimension extractable object 320 and the dimension extractable objects obtained from manager application 1810. The broker might create multiple containers, each container including different options and dimension extractable objects for the buyer to consider. In this example, the broker will have access to the pools that are useful for the job either directly (e.g., through access to manager applications and pools) or indirectly (e.g. choosing light fixtures through a specialty lighting supplier). Indirect access might be available only through another broker. In another variation of this embodiment, the broker may just give the buyer application 1810 access to a subset of dimension extractable object pools that he has access to or that he has filtered based upon the buyer's taste, and the broker then can ask the buyer to choose dimension extractable objects for the design job or to place objects into the original dimension extractable object.

If broker does not find sufficient dimension extractable objects from manager application 1810 or other manager applications, the broker might communicate with the supplier pools managed by supplier application 1830 and other supplier applications and request customization by exchanging dimension extractable objects with the suppliers, as discussed previously.

In these situations, the broker optionally may ask for a service fee from the buyer, or the broker might ask for a commission from the supplier pool.

In a variation of this embodiment, a human broker need not be used at all. Broker application 2410 can perform the tasks described above on its own without human intervention.

Figure 25:
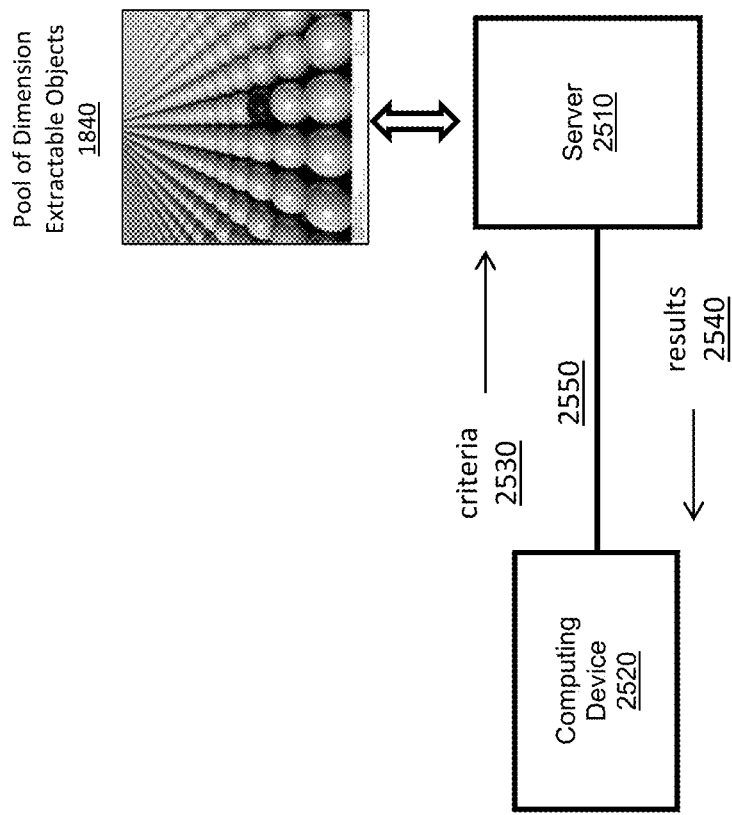
FIG. 25 depicts a server providing results to a computing device based on criteria from the computing device.

Additional detail is shown in FIG. 25 regarding performing searches with a pool of dimension extractable objects. Server 2510 maintains pool of dimension extractable objects 1840. Here, server 2510 is a high-level representation of transaction application 1820, supplier application 1830, manager applications 2210, 2310, 2311, or 2312, and/or broker application 2410 shown in FIGS. 21-24. Computing device 2520 is a high-level representation of buyer application 1810, supplier application 1830, transaction application 1820, manager applications 2210, 2310, 2311, or 2312, and/or broker application 2410 shown in FIGS. 21-24 Computing device 2520 communicates with server 2510 through application interface 2550 to implement a customized search algorithm. Computing device 2520 provides server 2510 with a set of criteria for products that are of interest to the user of computing device 2520, such as type of device, size of device, cost of device, etc. Server 2510 identifies a set of dimension extractable objects within pool 1840 that satisfy the set of criteria. Server 2510 then provides the set of dimension extractable objects to computing device 2520.

Another embodiment is shown in FIG. 26. Server 2610 maintains pool of dimension extractable objects 1840. Computing device 2620 is operated by User A and communicates with server 2610. Server 2610 operates recommendation engine 2640 and maintains user data 2630. Recommendation engine 2640 uses prior art method of recommending products that might be of interest to a particular user based on data collected for that user and other users. Recommendation engine 2640 optionally uses an AI engine. User Data 2630 optionally comprises purchasing history, credit history, web activity information, demographic information, and other information for User A and other users. Recommendation engine 2640 identified dimension extractable objects within pool 1840 that might be of interest to User A and sends those objects to computing device 2620 for User A's consideration.

In the embodiments described above, buyer application 1810, transaction application 1820, supplier application 1830, manager applications 2210 and 2310, and broker application 2410 each comprise lines of software code that operate on local devices (such as image and distance capture device 310, computing device 130, or other computing devices) or may reside in cloud-based servers.

Examples of transactions that can be performed using e-commerce system and method 2000 include the following:

- A buyer generates a dimension extractable object for a target model (e.g., replacement mechanical parts, custom fittings). A supplier matches the target model from stock or generates bids to reproduce the target model.
- A buyer generates a dimension extractable object for a target model. A supplier matches the derivative part from stock or generates bids to produce the derivative part. For example, a furniture cover (derivative part) for a sofa model (target model) or a helmet (derivative part) for a human model (target model)
- A buyer generates a dimension extractable object for a target space, e.g. unusually-shaped alcove within a home and requests custom furniture to fill the space. A supplier generates a bid to produce the object for the target space. Or, a buyer uses the supplier's dimensional extractable object to visualize the product within the target space.
- A supplier creates dimension extractable objects for his products and registers them with the transaction application. The transaction application may be enabled for automatic searches of potential buyers. The buyer application may search for and bid on the [suppliers'] registered dimension extractable objects.
- A buyer generates a dimension extractable object for his body with fashion preferences. A supplier or broker searches for clothing items to suggest to the buyer.

There may be more than two parties involved in a transaction. The parties may be multiple buyers or multiple suppliers. For example, a city may create a dimension extractable object container with multiple dimension extractable objects with details of sections of a community center and take bids for completing different sections of the project—e.g. landscaping, furniture, art, lighting. This will be the case of one buyer, multiple suppliers. Or, a city may subcontract each section of the project, each with responsibility for completing a section of the community center. Because each subcontractor may use different set of suppliers, the transaction may involve multiple buyer (subcontractors) and multiple suppliers.

The invention will have the following benefits for B2B (business-to-business), C2B (consumer-to-business), C2C (consumer-to-consumer), and other e-commerce transactions:

Low-overhead search for matching supplier.
  Because a dimension extractable object encapsulates all dimensions necessary to spec-out a part or a job, there is no need to take additional measurements.
  Transaction application 1320 sends supplier application 1330 a list of dimension extractable objects based on the supplier's profile. Machine-learning algorithms may be used to select dimension extractable objects based on the history of the supplier's transactions.
  Supplier application 1330 can perform second-level filtering of the dimension extractable objects by matching against supplier stock or capability.

Expansion of supplier/buyer market. When a buyer creates a request for a job in an internet-based open market, all necessary information is encapsulated in the dimension extractable object. Supplier application 1330 automatically generates the bid, for example, based on supplier capacity and stock, required date, and material cost. There is no need for on-site estimate or additional discussion with the buyer to take measurements.
  The buyer can choose from a large pool of global suppliers and choose a supplier that best fits his or her needs.
  The supplier has a much bigger pool of customers with very low marketing cost. A remote supplier (e.g., a custom machine-shop in Wyoming) can bid on projects nationwide or even worldwide. An artisan in Africa can market his jewelry worldwide.

Rapid qualification and execution of transaction.
  E-commerce metadata quickly qualifies the transactional parameters. For example, buyer application 1310 or supplier application 1330 can insert metadata related to maximum cost, required date, payment terms/method into a dimension extractable object. A qualified buyer/supplier can be identified by a private or open rating system (e.g., consumer credit scores, recommendations, qualified reviews, bank collaterals).
  Full contractual text can be appended to the dimension extractable object and the transaction completed with digital signatures.

Flexible, open system for project management. A dimension extractable object can be a request for an identical part, or a dimension extractable object job request can be more flexible.
  The buyer can specify whether he or she is willing to accept a modified proposal for a job. If there is a reasonable mechanical/aesthetic substitute for the original dimension extractable object request, the supplier can propose the modification through another dimension extractable object or more spec-based information (e.g. bamboo floor instead of hardwood).
  The flexible model will work especially well when the buyer requires expert feedback for a project. For example, the initial dimension extractable object can contain 3D images of an apartment for a re-model. A supplier or a broker (possibly an interior decorator or architect) can add elements into the dimension extractable object and bid for the job. The supplier dimension extractable object can spawn off new dimension extractable objects to furnish the interior space (custom furniture, light fixtures).

Object-based visualization/negotiation
  Additional image formats/dimension extractable objects can be inserted into dimension extractable object containers. This allows suppliers to add information on the project. If the images are dimension extractable objects, then buyer can use another application (e.g. 3D viewing software or virtual reality software) to visualize the project.

Visualization can be used before contract and during the project to assist in the interaction between buyer and supplier. This process can reduce miscommunication/errors during the project.

A single dimension extractable object can contain information that describes many different parts of a complex architecture, landscaping, or manufacturing project with links to related dimension extractable objects.

Anonymity/Privacy

Personal information is not required for dimension extractable objects but each dimension extractable object must have identifiers so a transaction can later establish communication between buyers and suppliers.

By keeping all e-commerce related metadata with the object model, buyer application 1310, transaction application 1320, and supplier application 1330 can automate and optimize the work required to create bids.

Using digital identifiers and signatures, the initial negotiations can be anonymous.

References to the present invention herein are not intended to limit the scope of any claim or claim term, but instead merely make reference to one or more features that may be covered by one or more of the claims. Structures, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between).

What is claimed is:

1. A method of transmitting and utilizing a dimension extractable object comprising image data and spatial metadata, the method comprising:
    receiving, by a computing device, the dimension extractable object;
    extracting, by the computing device, the image data and the spatial metadata from the dimension extractable object, the image data corresponding to an image captured by a device and the spatial metadata comprising image position data and distance data, the distance data indicating a distance between the device and a physical object depicted in the image at the time the image data was captured; and
    calculating, by the computing device, dimensions of the physical object using the image position data and the distance data.

2. The method of claim 1, further comprising:
    displaying the image using the image data; and
    displaying distance information for one or more pixels in the image using the spatial metadata.

3. The method of claim 1, further comprising:
    displaying the image using the image data; and
    displaying the dimensions of the physical object.

4. The method of claim 1, further comprising:
    performing a transformation of the image data using a lens model contained in the spatial metadata.

5. The method of claim 1, wherein the spatial metadata comprises one or more of camera angular velocity data, camera linear velocity data, and camera tilt position.

6. The method of claim 1, wherein the receiving step comprises receiving a container comprising the dimension extractable object.

7. The method of claim 1, wherein the receiving step comprises receiving a tar or zip file comprising the dimension extractable object.

8. The method of claim 1, wherein the receiving step comprises receiving a JPEG file containing the dimension extractable object.

9. The method of claim 1, wherein the image data comprises data for a still image.

10. The method of claim 1, wherein the image data comprises data for video.

11. The method of claim 1, wherein the image data comprises data for a 3D model.

12. The method of claim 8, wherein the spatial metadata is stored in an APPn field within the JPEG file.

13. A device for storing and utilizing a dimension extractable object comprising image data and spatial metadata, the device comprising:
    a processing unit and memory; and
    instructions stored in the memory and executable by the processor for extracting image data and spatial metadata from a dimension extractable object stored in the memory, the image data corresponding to an image captured by a device and the spatial metadata comprising image position data and distance data, the distance data indicating a distance between the device and a physical object depicted in the image at the time the image data was captured, and calculating dimensions of a physical object depicted in the image using the image position data and distance data.

* * * * *